US009239678B2

(12) United States Patent
Liu et al.

(10) Patent No.: US 9,239,678 B2
(45) Date of Patent: Jan. 19, 2016

(54) ELECTRONIC DEVICE AND METHOD, CELL PHONE, PROGRAM TO ACHIEVE PRESET OPERATION COMMAND THEREOF

(75) Inventors: Xiangtao Liu, Beijing (CN); Dayong Gan, Beijing (CN); Lei Lv, Beijing (CN); Rong Zhang, Beijing (CN); Ming Cai, Beijing (CN); Nan Wang, Beijing (CN)

(73) Assignees: BEIJING LENOVO SOFTWARE LTD., Haidan District, Beijing (CN); LENOVO (BEIJING) CO., LTD., Haidan District, Beijing (CN)

( * ) Notice: Subject to any disclaimer, the term of this patent is extended or adjusted under 35 U.S.C. 154(b) by 562 days.

(21) Appl. No.: 13/497,307

(22) PCT Filed: Sep. 21, 2010

(86) PCT No.: PCT/CN2010/077192
§ 371 (c)(1),
(2), (4) Date: Mar. 21, 2012

(87) PCT Pub. No.: WO2011/032521
PCT Pub. Date: Mar. 24, 2011

(65) Prior Publication Data
US 2012/0306793 A1 Dec. 6, 2012

(30) Foreign Application Priority Data

Sep. 21, 2009 (CN) .......................... 2009 1 0093821
Dec. 31, 2009 (CN) .......................... 2009 1 0244578

(51) Int. Cl.
G06F 3/0488 (2013.01)
(52) U.S. Cl.
CPC ........ *G06F 3/04886* (2013.01); *G06F 3/04883* (2013.01); *H04M 2250/22* (2013.01)

(58) Field of Classification Search
CPC .......... G09G 5/00; G09G 3/00; G06F 3/0416; G06F 3/0488
See application file for complete search history.

(56) References Cited

U.S. PATENT DOCUMENTS 7,783,789 B2      8/2010   Zhu et al.
2007/0089069 A1*  4/2007   Hsieh et al. ................... 715/810
(Continued)

FOREIGN PATENT DOCUMENTS

CN           1949161          4/2007
CN          101110005         1/2008
(Continued)

OTHER PUBLICATIONS

PCT/CN2010/077192 International Preliminary Report on Patentability dated Mar. 27, 2012 (7 pages).
(Continued)

*Primary Examiner* — Michael Faragalla
(74) *Attorney, Agent, or Firm* — Brinks Gilson & Lione; G. Peter Nichols

(57) ABSTRACT

A touch-input device and an electronic device and a cell phone are described and include a touch acquisition module with an input area to execute touch acquisition operations. The input area includes a first area and a second area. A pointing object location module is used to determine the start location of the touch operation according to the data acquired by the touch acquisition module. A process module is used to calculate a first result indicating the coordinate of the pointing object according to the data acquired by the touch acquisition module when the start location of the touch operation is in the first area, and to calculate a second result indicating the movement of the pointing object according to the data acquired by the touch acquisition module when the start location of the touch operation is in the second area.

24 Claims, 13 Drawing Sheets

(56) References Cited

U.S. PATENT DOCUMENTS

| | | | |
|---|---|---|---|
| 2007/0236475 A1 | 10/2007 | Wherry | |
| 2008/0052422 A1* | 2/2008 | Zhu et al. | 710/14 |
| 2009/0117944 A1 | 5/2009 | Lee et al. | |

FOREIGN PATENT DOCUMENTS

| | | |
|---|---|---|
| CN | 101431552 | 5/2009 |
| CN | 101482785 | 7/2009 |

OTHER PUBLICATIONS

First Office Action dated Dec. 23, 2011 from corresponding Chinese Application No. 200910093821.3 (12 pages including English translation).

Rejection Decision dated Sep. 25, 2012 from corresponding Chinese Application No. 200910093821.3 (15 pages including English translation).

First Office Action dated Feb. 15, 2012 from corresponding Chinese Application No. 200910244578.0 (18 pages including English translation).

Second Office Action dated Dec. 31, 2012 from corresponding Chinese Application No. 200910244578.0 (22 pages including English translation).

Rejection Decision dated Jun. 4, 2013 from corresponding Chinese Application No. 200910244578.0 (20 pages including English translation).

PCT/CN2010/077192 International Search Report dated Dec. 13, 2010 (3 pages).

* cited by examiner

ELECTRONIC DEVICE AND METHOD, CELL PHONE, PROGRAM TO ACHIEVE PRESET OPERATION COMMAND THEREOF

FIELD OF THE INVENTION

The present invention relates to the field of touching technique, and in particularly, to an electronic device, and method, mobile phone and program implementing preset operation instruction thereof.

BACKGROUND

The touching technique has been applied to various electronic devices widely, such as a mobile phone, a PDA, a notebook computer, etc.

More and more electronic devices (for example, the mobile phone) may have realized a completely touch input now, that is, all of the operation instruction (such as RETURN (or BACK), EXIT, MENU) are implemented by a touch input device.

In the prior art, in order to perform operations by a touch screen, not only a locating process is needed, but also actions of a pointing object have to be determined. For example, sliding upwards on the input surface of the touch input device by the pointing object may represent enlarging the current image, while sliding leftwards on the input surface of the touch input device by the pointing object may represent that the user needs to see the next picture. There is more than one similar example, so their details are omitted.

Since both gestures of the user and coordinates of the pointing object have to be determined at the same time, resource is wasted and even mis-operations may occur. Such examples are as follows.

When the user wants to click an icon in an operation interface, only a location operation is needed, however, a CPU would perform calculations continually on the operation actions before the pointing object slides to a target location on the touch screen because the CPU does not know whether the user wants to click one icon or perform other operations. Obviously, calculations at this time is unnecessary because what the use wants to do is just to click the icon and results in a waste of the calculation resource and the power resource.

Additionally, the electronic devices having a touch screen in the art generally are disposed with physical keys in other regions outside of the display screen of the electronic device so as to complete operations of corresponding shortcut-keys, if they desire to realize certain shortcut-key functions (such as a function of main interface key (generally referred as a home key). For example, referring to FIG. 1, a mobile phone having a touch screen is disposed with several physical function keys in a shortcut-key operation area B below a display screen A, and the key or the identified area of the key must be clicked to trigger corresponding operation instruction if one wants to implement the operation instruction of the corresponding function key. In addition to the case in FIG. 1, there are many other cases to implement the corresponding shortcut-key function, such as disposing the shortcut-keys on one side of the mobile phone, and so on.

The physical keys must be disposed in order to implement the shortcut-key functions in the prior art, and in turn the click area is limited when implementing the operation of the corresponding function, which causes the way of operation to be inflexible and brings inconvenience to users.

SUMMARY

In view of this, the present invention provides a method for implementing preset operation instruction in special areas of an electronic device, an electronic device, a mobile phone and a program, which may reduce the unnecessary calculations and increases the utilization rates of the calculation resource and the power resource, and further solve the problem of inconvenient operation brought by the requirement of the physical keys as implementing certain shortcut-key operations in the electronic device having the touch screen in the prior art.

In order to realize the objects above described, an embodiment of the present invention provides an electronic device, comprising:

a touch acquisition module having an input area, which performs the touch acquisition operation, the input area includes a first area and a second area;

a processing module, which calculates a first result indicating coordinates of a pointing object according to the data acquired by the touch acquisition module, when the start position of a touch operation is in the first area, and calculates a second result indicating an action of the pointing object according to the data acquired by the touch acquisition module, when the start position of the touch operation is in the second area.

In the above-described electronic device, wherein the processing module further acquires operation instruction corresponding to preset actions matched with the actions of the pointing object, when the start position of the touch operation is in the second area.

Wherein the above-described electronic device may further comprise:

a display screen; and a part of the touch acquisition module which is located in the first area is disposed overlapping with the display screen.

Wherein the above-described electronic device may further comprise a mainboard and a CPU disposed on the mainboard as the processing module, and the touch acquisition module is connected to the mainboard and sends the acquired data to the CPU through the mainboard.

In the above-described electronic device, wherein the CPU is used to calculate the second result indicating the action of the pointing object according to the data acquired by the touch acquisition module and acquires the operation instruction corresponding to preset actions matched with the action of the pointing object, when the start position of the touch operation is in the second area.

Wherein the above-described electronic device may further comprise:

a mainboard and a CPU disposed on the mainboard, the processing module is a microcontroller, and the microcontroller is connected to the mainboard and sends the first result or the second result to the CPU through the mainboard.

In the above-described electronic device, wherein the microcontroller may further comprise:

a pointing object location unit for determining the start position of the touch operation according to the data acquired by the touch acquisition module;

a coordinate calculation unit for calculating the coordinates of the pointing object according to the data acquired by the touch acquisition module, when the start position of the touch operation is in the first area;

an action calculation unit for calculating the second result indicating the action of the pointing object according to the data acquired by the touch acquisition module, when the start position of the touch operation is in the second area;

an instruction acquisition unit for acquiring the operation instruction corresponding to preset actions matched with the action of the pointing object;

an output unit for sending the coordinates of the pointing object or the operation instruction to the CPU through the mainboard.

The processing module may further judge a corresponding touch mode according to the second result indicating the action of the pointing object, and determine the corresponding operation instruction according to a preset correspondence relationship between the touch mode and the operation instruction and perform the operation instruction.

The corresponding touch mode may be calculated in the following way: judging whether there is a movement track of the pointing object according to the second result indicating the action of the pointing object; if there is, determining this touch mode as sliding and thus obtaining the touch mode corresponding to the track of this touching; if there is no movement track of the pointing object, judging whether a contact time period with a contact point is larger than a preset contact time period, determining the corresponding touch mode as a long-pressing if it is, otherwise determining the corresponding touch mode as a clicking; and after determining the touch mode as the clicking, determining the touch mode as a double-clicking when another clicking occurs during a preset spacing time period.

The corresponding operation instruction may be the operation instruction for implementing the function of the main interface key of the electronic device, when the touch mode is sliding, clicking, long-pressing and/or double-clicking.

The corresponding operation instruction may be the operation instruction for implementing a BACK function of the electronic device, when the touch mode is a leftward sliding.

In order to realize the above-described objects, an embodiment of the present invention provides a touch input device for an electronic device, the electronic device having a mainboard and a CPU disposed on the mainboard, the touch input device comprising:

a touch acquisition module having an input area, which performs the touch acquisition operation, the input area includes a first area and a second area;

a microcontroller, which performs a location operation to determine a start position of a touch operation according to the data acquired by the touch acquisition module, calculates a first result indicating coordinates of a pointing object according to the data acquired by the touch acquisition module and sends it to the CPU through the mainboard, when the start position of the touch operation is in the first area, and calculates a second result indicating an action of the pointing object according to the data acquired by the touch acquisition module and sends it to the CPU through the mainboard, when the start position of the touch operation is in the second area.

In the above-described touch input device, wherein the microcontroller further acquires operation instruction corresponding to preset actions matched with the action of the pointing object, when the start position of the touch operation is in the second area.

In the above-described touch input device, wherein the first area is disposed overlapping with a display screen on the electronic device.

In the above-described touch input device, wherein the microcontroller may further comprise:

a pointing object location unit for determining the start position of the touch operation according to the data acquired by the touch acquisition module;

a coordinate calculation unit for calculating the coordinates of the pointing object according to the data acquired by the touch acquisition module, when the start position of the touch operation is in the first area;

an action calculation unit for calculating the second result indicating the action of the pointing object according to the data acquired by the touch acquisition module, when the start position of the touch operation is in the second area;

an instruction acquisition unit for acquiring the operation instruction corresponding to preset actions matched with the action of the pointing object;

an output unit for sending the coordinates of the pointing object or the operation instruction to the CPU through the mainboard.

The microcontroller may further judge a corresponding touch mode according to the second result indicating the action of the pointing object, and determine the corresponding operation instruction according to a preset correspondence relationship between the touch mode and the operation instruction and perform the operation instruction.

The corresponding touch mode may be calculated in the following way: judging whether there is a movement track of the pointing object according to the second result indicating the action of the pointing object; if there is, determining this touch mode as sliding and thus obtaining the touch mode corresponding to the track of this touching; if there is no movement track of the pointing object, judging whether a contact time period with a contact point is larger than a preset contact time period, determining the corresponding touch mode as a long-pressing if it is, otherwise determining the corresponding touch mode as a clicking; and after determining the touch mode as the clicking, determining the touch mode as a double-clicking when another clicking occurs during a preset spacing time period.

The corresponding operation instruction may be the operation instruction for implementing the function of the main interface key of the electronic device, when the touch mode is sliding, clicking, long-pressing and/or double-clicking.

The corresponding operation instruction may be the operation instruction for implementing a BACK function of the electronic device, when the touch mode is a leftward sliding.

In order to realize the above-described objects, an embodiment of the present invention provides a mobile phone comprising a mainboard, a CPU disposed on the mainboard and a display screen connected to the mainboard, further comprising:

a touch acquisition module having an input area, which performs the touch acquisition operation, the input area includes a first area and a second area;

a microcontroller, which performs a location operation to determine a start position of a touch operation according to the data acquired by the touch acquisition module, directly sends the data acquired by the touch acquisition module to the CPU, which processes the data, through the mainboard, when the start position of the touch operation is in the first area; and calculates an action of the pointing object according to the data acquired by the touch acquisition module, acquires operation instruction corresponding to preset actions matched with the action of the pointing object and sends the operation instruction to the CPU, which performs operations corresponding to the operation instruction according to the operation instructions, through the mainboard, when the start position of the touch operation is in the second area.

In the above-described mobile phone, a part of the touch acquisition module which is located in the first area is disposed overlapping with the display screen.

In the above-described mobile phone, wherein the microcontroller may further comprise:
- a pointing object location unit for determining the start position of the touch operation according to the data acquired by the touch acquisition module;
- an action calculation unit for calculating the action of the pointing object according to the data acquired by the touch acquisition module, when the start position of the touch operation is in the second area;
- an instruction acquisition unit for acquiring the operation instruction corresponding to preset actions matched with the action of the pointing object;
- an output unit for outputting the data acquired by the touch acquisition module to the CPU through the mainboard when the start position of the touch operation is in the first area, and for outputting the operation instruction to the CPU through the mainboard when the start position of the touch operation is in the second area.

The microcontroller may further obtain a corresponding touch mode according to the action of the pointing object by calculation, and determine the corresponding operation instruction according to a preset correspondence relationship between the touch mode and the operation instruction and perform the operation instruction.

The corresponding touch mode may be calculated in the following way: judging whether there is a movement track of the pointing object according to the action of the pointing object; if there is, determining this touch mode as sliding and thus obtaining the touch mode corresponding to the track of this touching; if there is no movement track of the pointing object, judging whether a contact time period with a contact point is larger than a preset contact time period, determining the corresponding touch mode as a long-pressing if it is, otherwise determining the corresponding touch mode as a clicking; and after determining the touch mode as the clicking, determining the touch mode as a double-clicking when another clicking occurs during a preset spacing time period.

The corresponding operation instruction may be the operation instruction for implementing the function of the main interface key of the electronic device, when the touch mode is sliding, clicking, long-pressing and/or double-clicking.

The corresponding operation instruction may be the operation instruction for implementing a BACK function of the electronic device, when the touch mode is a leftward sliding.

An embodiment of the present invention provides a method for an electronic device, wherein the electronic device comprises a touch acquisition module having an input area, which performs the touch acquisition operation, the input area includes a first area and a second area;
- wherein the method comprises: calculating a first result indicating coordinates of the pointing object according to the data acquired by the touch acquisition module, when a start position of the touch operation is in the first area, and calculating a second result indicating an action of the pointing object according to the data acquired by the touch acquisition module, when the start position of the touch operation is in the second area.

The above-described method may further comprise acquiring operation instruction corresponding to preset actions matched with the action of the pointing object, when the start position of the touch operation is in the second area.

The above-described method may further comprise obtaining a corresponding touch mode according to the action of the pointing object by calculation, and determining the corresponding operation instruction according to a preset correspondence relationship between the touch mode and the operation instruction and performing the operation instruction.

The corresponding touch mode may be calculated in the following way: judging whether there is a movement track of the pointing object according to the second result indicating the action of the pointing object; if there is, determining this touch mode as sliding and thus obtaining the touch mode corresponding to the track of this touching; if there is no movement track of the pointing object, judging whether a contact time period with a contact point is larger than a preset contact time period, determining the corresponding touch mode as a long-pressing if it is, otherwise determining the corresponding touch mode as a clicking; and after determining the touch mode as the clicking, determining the touch mode as a double-clicking when another clicking occurs during a preset spacing time period.

The corresponding operation instruction may be the operation instruction for implementing the function of the main interface key of the electronic device, when the touch mode is sliding, clicking, long-pressing and/or double-clicking.

The corresponding operation instruction may be the operation instruction for implementing a BACK function of the electronic device, when the touch mode is a leftward sliding.

A part of the touch acquisition module which is located in the first area is disposed overlapping with the display screen.

An embodiment of the present invention provides a program for an electronic device, wherein the electronic device comprises a touch acquisition module having an input area, which performs the touch acquisition operation, the input area includes a first area and a second area;
- wherein the program causes the electronic device to perform the following steps: calculating a first result indicating coordinates of a pointing object according to the data acquired by the touch acquisition module, when a start position of the touch operation is in the first area, and calculating a second result indicating an action of the pointing object according to the data acquired by the touch acquisition module, when the start position of the touch operation is in the second area.

The present invention also provides solutions as follows.

A method for implementing preset operations in a special area of the electronic device, the electronic device includes a touch acquisition module and a display screen, a input area being divided into a first area and a second area is disposed on the touch acquisition module, the first area is superposed with the display screen and the special area is the second area, comprising:
- receiving a touch information indicating that a start position of a touch by a pointing object is in the special area;
- judging a touch mode corresponding to the touch information;
- determining a corresponding operation instruction according to a preset correspondence relationship between the touch mode and the operation instruction and performing the operation instruction.

Optionally, the corresponding touch mode may be judged in the following way:
- judging whether there is a movement track of the pointing object according to the touch information; if there is, determining this touch mode as sliding and thus obtaining the touch mode corresponding to the track of this touch; if there is no movement track of the pointing object, judging whether a contact time period with a contact point is larger than a preset contact time period, determining the corresponding touch mode as a long-pressing if it is, otherwise determining the corresponding touch mode as a clicking.

Optionally, after determining the touch mode as the clicking, determining the touch mode as a double-clicking when another clicking occurs during a preset spacing time period.

Optionally, lighting an indicator light lying in the special area after determining the touch mode as the clicking.

Optionally, the corresponding operation instruction may be the operation instruction for implementing the function of the main interface key of the electronic device, when the touch mode is sliding, clicking, long-pressing and/or double-clicking.

Optionally, the corresponding operation instruction may be the operation instruction for implementing a BACK function of the electronic device, when the touch mode is a leftward sliding.

The present invention also discloses an electronic device, comprising:
a touch acquisition module being configured to have an input area, which acquires the touch information in the input area, the input area includes a first area and a second area;
a display screen superposed with a part of the touch acquisition module which is located in the first area;
a microcontroller, which obtains a corresponding touch mode according to the data acquired by the touch acquisition module by calculation, and determines the corresponding operation instruction according to a preset correspondence relationship between the touch mode and the operation instruction and sends the same, when the start position of the touch operation is in the second area;
a CPU, which receives and performs the preset operation instruction.

Optionally, the microcontroller comprises:
a calculation unit for obtaining the corresponding touch mode according to the data acquired by the touch acquisition module by calculation, when the start position of the touch operation is in the second area; and
a match unit for obtaining the preset operation instruction corresponding to the touch mode by match, according to the touch mode obtained by the calculation unit.

Optionally, the microcontroller further comprises:
a contact point location unit for determining a position of the contact point according to the data acquired by the touch acquisition module;
a timing unit for recording a contact time period during which a pointing object contacts with the touch acquisition module when there is one contact pointing object and recording an order of the respective contact points when there are multiple contact points; and
an output unit for outputting the preset operation instruction to the CPU to be performed, after the calculation unit obtains the touch mode by calculation and the match unit obtains the preset operation instruction corresponding to the touch mode by match, when the contact point is located in the second area.

Optionally, the touch mode may be double-clicking, clicking, long-pressing and/or sliding, and the corresponding operation instruction may be the operation instruction for implementing the function of the main interface key of the electronic device.

Optionally, the corresponding operation instruction may be the operation instruction for implementing a BACK function of the electronic device, when the touch mode is a leftward sliding.

The present invention also discloses a mobile phone, comprising a mainboard, a CPU disposed on the mainboard and a display screen connected to the mainboard, further comprising:
a touch acquisition module being configured to have an input area, which acquires the touch information in the input area, the input area includes a first area superposed with the display screen and a second area;
a microcontroller, which obtains a corresponding touch mode according to the data acquired by the touch acquisition module by calculation, obtains a preset operation instruction corresponding to the touch mode by match, and sends the preset operation instruction to the CPU through the mainboard so that the CPU responds with operations corresponding to the preset operation instruction according to the preset operation instruction, when the start position of the touch operation is in the second area.

Optionally, the microcontroller comprises:
a contact point location unit for determining a position of the contact point according to the data acquired by the touch acquisition module;
a timing unit for recording a contact time period during which a pointing object contacts with the touch acquisition module when there is one contact pointing object and recording an order of the respective contact points when there are multiple contact points;
a calculation unit for calculating the touch mode according to the data acquired by the touch acquisition module, when the start position of the touch operation is in the second area;
a match unit for obtaining the preset operation instruction corresponding to the touch mode according to the touch mode by match; and
an output unit for outputting the preset operation instruction to the CPU to be performed, when the start position of the touch operation is located in the second area.

Optionally, the touch mode may be double-clicking, clicking, long-pressing and/or sliding, and the corresponding operation instruction may be the operation instruction for implementing the function of the main interface key of the electronic device.

Optionally, the corresponding operation instruction may be the operation instruction for implementing a BACK function of the electronic device, when the touch mode is a leftward sliding.

The present invention also discloses a program used for an electronic device comprising a touch acquisition module and a display screen, wherein the touch acquisition module is configured to have a input area divided into a first area superposed with the display screen and a second area as a special area, the program causes the electronic device to perform the steps as follows:
receiving touch information indicating that a start position of a touch by a pointing object is in the special area;
judging a touch mode corresponding to the touch information;
determining and performing corresponding operation instruction according to a preset correspondence relationship between the touch mode and the operation instruction.

The embodiments of the present invention provide the following advantageous effects.

In the embodiments of the present invention, the input area of the touch acquisition module is divided into the first area and the second area which are for touch pointing operation and gesture operation, respectively, and the corresponding calculation manner is selected and performed by judging the start position of the touch operation. Therefore, when the user operates in one of the areas, either the coordinates of the pointing object is outputted or the gesture is calculated, and these two operations will not be performed at the same time, which may avoid the unnecessary calculations and increase the utilization rates of the calculation resource and the power resource.

Because the two areas are used for pointing input and gesture input, respectively, the requirement for the touch input can be met.

Meantime, a response speed of the touch input can be increased, because the processing resource is needed in the calculation for only one of the operations.

Regarding the mobile phone according to the embodiment of the present invention, since the calculation can be performed for gesture starting from the B area, continuous sliding operations in the A area by the pointing object are necessarily reduced greatly, thus the unnecessary calculations of the CPU can be reduced, the utilization rates of the calculation resource and the power resource are increased.

Furthermore, the embodiments of the present invention judge the touch mode of the pointing object by receiving the touch information indicating that the pointing object is in the special area of the electronic device, and then determine the operation instruction corresponding to the touch mode according to the preset correspondence relationship between the touch mode and the operation instruction and perform the operations thereafter. During the entire process, the user can initiate the operation instruction corresponding to a gesture only by making the corresponding gesture operation (i.e., the corresponding touch mode) in the special area of the electronic device, whereas the detailed position of the gesture operation is not limited strictly, as long as it is in the special area of the electronic device.

With the solutions in the embodiments of the present invention, the corresponding shortcut-key function can be initiated provided that the corresponding gesture operation is made in the special area without disposing any physical functional keys in the special area of the electronic device, which in turn brings convenience to the user during their operation and improves the flexibility of the operation.

BRIEF DESCRIPTION OF THE DRAWINGS

In order to set forth the solutions in the embodiments of the present invention or in the prior art more clearly, the accompanying drawings used in the description for the embodiments and the prior art will be introduced briefly hereinafter. Obviously, the accompanying drawings in the following description are only certain embodiments of the present invention, and those of ordinary skill in the art can understand that other accompanying drawings could be derived from these accompanying drawings without any inventive labors.

DETAILED DESCRIPTION

Figure 1:
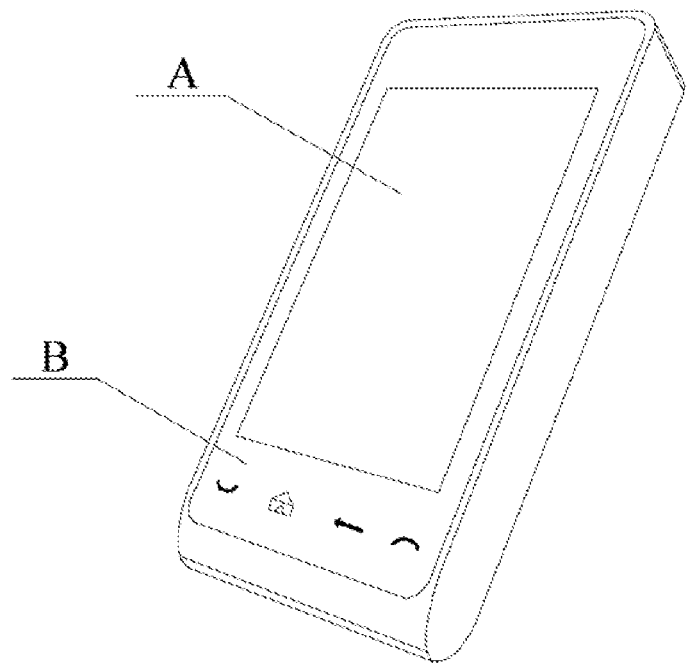
FIG. 1 is a diagram illustrating a structure of a mobile phone having a touch screen in the prior art.
Figure 2:
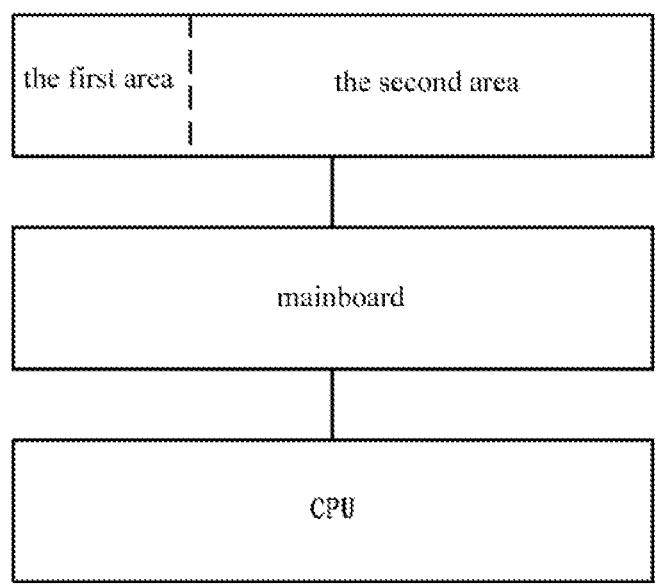
FIG. 2 is a schematic diagram illustrating a structure of an electronic device according to an embodiment of the present invention.

Solutions in the embodiments of the present invention will now be described clearly and fully in details in connection with the accompanying drawings of the embodiments of the present invention. Obviously, the described embodiments are only a part of the embodiments of the present invention, but not all embodiments. Based on the embodiments of the present invention, those of ordinary skill in the art can derive other embodiments without any inventive labors, and the all other embodiments are within the scope sought for protection by the present invention.

The respective embodiments in this specification are described progressively, wherein each of the embodiments is emphasized on its difference from other embodiments, because their similar parts could be referred to with each other among the respective embodiments. As to an apparatus disclosed in the embodiment of the present invention, the description thereof is simpler because it corresponds to the method disclosed in the embodiment of the present invention, and the relative parts could be referred to the description for the method.

In the embodiments of the present invention, the input area having the touch acquisition module is divided into the first area and the second area which are for touch pointing operation and gesture operation, respectively, and the corresponding calculation manner is selected and performed by judging the start position of the touch operation. Therefore, the requirements for the touch input are met, while the unnecessary calculations are avoided and in turn the utilization rates of the calculation resource and the power resource are increased.

An electronic device according to an embodiment of the present invention comprises:
- a touch acquisition module having an input area, which performs the touch acquisition operation, the input area includes a first area and a second area;
- a processing module, which calculates a first result indicating coordinates of the pointing object according to the data acquired by the touch acquisition module, when a start position of the touch operation is in the first area, and calculates a second result indicating an action of the pointing object according to the data acquired by the touch acquisition module, when the start position of the touch operation is in the second area.

In the embodiment of the present invention, the processing module may further acquire an operation instruction corresponding to a preset action matched with the action of the pointing object, when the start position of the touch operation is in the second area.

In the detailed embodiment of the present invention, the processing module may be a CPU of the electronic device or a MCU (microcontroller) connecting the touch acquisition module to a mainboard, or even be implemented with both of the CPU and the microcontroller. For example, the MCU calculates the start position of the touch operation and informs the CPU of the result, and the CPU performs calculations on the received data according to the result in order to obtain the coordinates or the gesture of the pointing object.

Thereafter, the descriptions are given to the former two cases.

<The Processing Module is the CPU of the Electronic Device>

As shown in FIG. 1, in a case that the processing module is the CPU of the electronic device, the electronic device comprises a mainboard and the CPU disposed on the mainboard, and further comprises:
- a touch acquisition module having an input area, which is connected to the mainboard and performs the touch acquisition operation, the input area includes a first area and a second area;
- the CPU is used to determine a start position of the touch operation according to the data acquired by the touch acquisition module, calculates a first result indicating coordinates of the pointing object according to the data acquired by the touch acquisition module when a start position of the touch operation is in the first area, and calculates a second result indicating an action of the pointing object according to the data acquired by the touch acquisition module when the start position of the touch operation is in the second area.

Of course, the CPU needs to convert the action of the pointing objects into the operation instruction and sends the same to applications so as to be easily recognized by the applications.

Of course, in the detailed embodiment of the present invention, taking the variations of gestures made by the user into account, instead of sending the second result to the applications directly, CPU may match the action of the pointing object with the preset action at first after it obtains the second result indicating the action of the pointing object according to the data acquired by the touch acquisition module by calculation.

The examples are described as follows.

Assuming a picture software is running currently, an action of sliding rightward in the first area by the pointing object, an action of sliding leftward in the first area by the pointing object, and an action of circling in the first area by the pointing object are predefined, and each of these actions corresponds to an instruction of the operation programs, such as enlarging, reducing, turning to the next picture in the picture software.

Figure 3:
FIG. 3 is a schematic diagram illustrating a second result indicating an action of the pointing object obtained by calculating data acquired by a touch acquisition module by a CPU.
Figure 4:
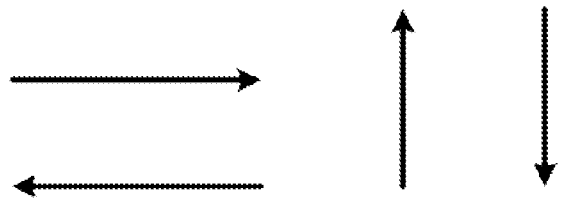
FIG. 4 is a schematic diagram illustrating the preset actions.

Given the second result (that is, the movement track of the pointing object) indicating the action of the pointing object obtained by the CPU's calculation according to the data acquired by the touch acquisition module is as shown in FIG. 3, and the preset actions include four actions as shown in FIG. 4, it may determine that the corresponding preset action is the action of sliding rightward by performing matching operation, i.e., the action in upper-left position in FIG. 4.

Then, the operation instruction corresponding to the preset action is sent to the applications.

In the embodiment of the present invention, the electronic device may be an electronic device having a touch screen, that is to say, the electronic device may further comprises:
- a display screen; and
- a part of the touch acquisition module which is located in the first area is disposed overlapping with the display screen.

Of course, a part of the touch acquisition module which is located in the second area may also be disposed overlapping with the display screen, or may be an area outside the display screen.

However, it should be understood that no operable icons, such as applications icons, a START menu icon, a desktop-showing icon, etc., should be set in the part of display screen superposed with the second area if the part of the touch acquisition module which is located in the second area is disposed overlapping with the display screen, but some inoperable icons, such as a LOGO, etc., could be displayed.

Figure 5:
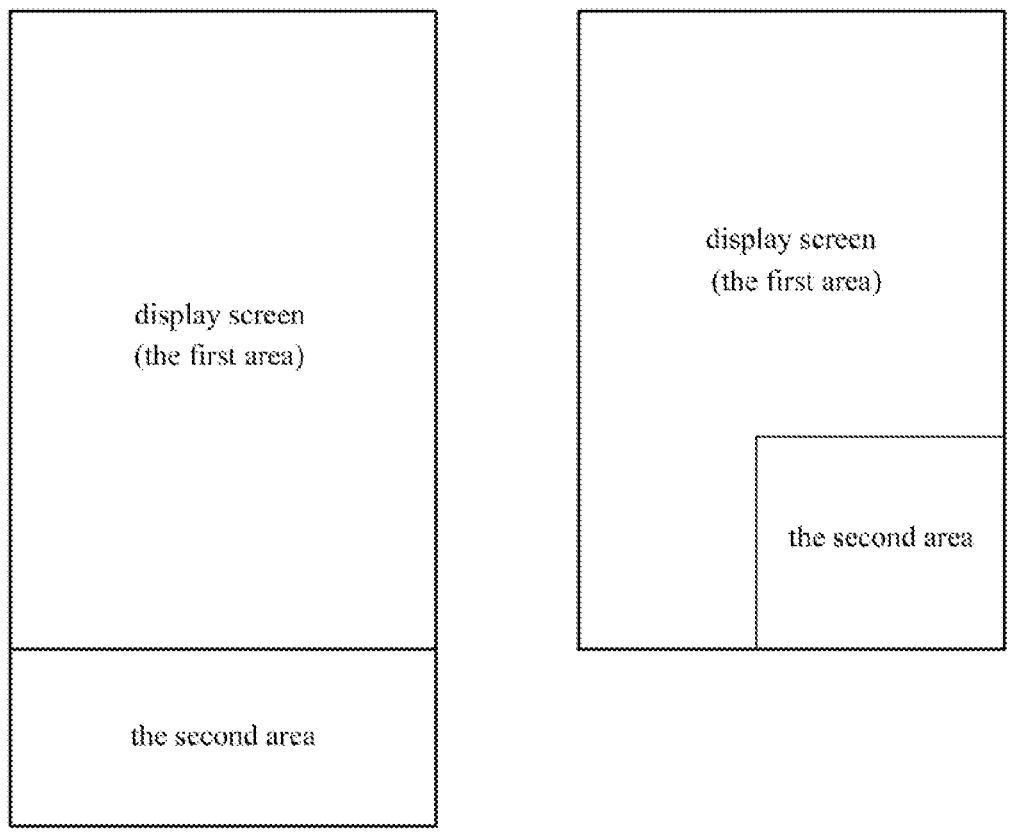
FIG. 5 is a schematic diagram illustrating the relative position relationship between the touch acquisition module and a display screen.

As shown in FIG. 5, in the structure in the left of the FIG. 5, the part of the touch acquisition module which is located in the first area is disposed overlapping with the display screen, while the second area is outside the display screen. In the structure in the right of FIG. 5, the part of the touch acquisition module which is located in the first area is disposed overlapping with the display screen and the second area is also disposed overlapping with the display screen, but the second area is located at the lower-right corner of the display screen, as long as no executable icons are set in the lower-right corner of the display screen.

In the detailed embodiment of the present invention, the processing module may further judge a corresponding touch mode according to the second result indicating the action of the pointing object, and determine the corresponding operation instruction according to a preset correspondence relationship between the touch mode and the operation instruction and perform the operation instruction.

In the detailed embodiment of the present invention, the corresponding touch mode may be calculated in the following way: judging whether there is a movement track of the pointing object according to the second result indicating the action of the pointing object; if there is, determining this touch mode as a sliding and thus obtaining the touch mode corresponding to the track of this touching; if there is no movement track of the pointing object, judging whether a contact time period with a contact point is larger than a preset contact time period, determining the corresponding touch mode as a long-pressing if it is, otherwise determining the corresponding touch mode as a clicking; and after determining the touch mode as the clicking, determining the touch mode as a double-clicking when another clicking occurs during a preset spacing time period.

In the detailed embodiment of the present invention, the corresponding operation instruction may be the operation instruction for implementing the function of the main interface key of the electronic device, when the touch mode is the sliding, the clicking, the long-pressing and/or the double-clicking.

In the detailed embodiment of the present invention, the corresponding operation instruction may be the operation instruction for implementing a BACK function of the electronic device, when the touch mode is a leftward sliding.

In the detailed embodiment of the present invention, the touch acquisition module may be a structure as follows.

Capacitance Type

According to capacitance induction principle, any conductive electrode may form a group of capacitor Cp with the earth or another conductor. When fingers of human or human body itself comes close to the capacitor Cp, parasitic capacitance of the human body will couple to both of the polar plates of the Cp, which renders the value of the Cp to become greater. Thus, whether the human body comes close to the capacitor Cp may be measured by measuring the change of the Cp. The array of the electrodes constructs a coordinate system, and the capacitance value of the corresponding electrodes will change as finger(s) draws on the surface of the array. Coordinates value(s) where the user's finger (one or more fingers) is and the change of the coordinates may be known by analyzing and calculating the changes of the capacitance values of respective electrodes.

Infrared Rays Type

A circuit board frame is mounted in the front of the display, and infrared transmitting tubes and infrared receiving tubes are arranged surrounding the four sides of the screen through the circuit board, so that an infrared ray matrix can be formed in which the infrared transmitting tubes and the corresponding infrared receiving tubes cross with each other. When the user touches the screen, his/her finger(s) may block two infrared rays both in the horizontal direction and in the vertical direction which pass this position, therefore a position at which the contact point is in the screen and a movement track may be judged.

Resistance Type

A resistance film screen perfectly matching with the surface of the display is disposed, and two OTI transparent conductive layers of metal oxide on surface of a tempered glass are coated. Control is done by sensing pressures. When a finger touches the screen, the two conductive layers will contact with each other at the position of a touch point and resistance will change. Signals are generated in both the X and the Y directions, and in turn a controller detects this contact and calculates its coordinates, so that a position at which the contact point is in the screen and a movement track may be judged.

SAW (Surface Acoustic Wave) Type

Transducers for transmitting and receiving acoustic wave in both X and Y directions are attached to three corners on the screen (transducer: made of special ceramics materials and classified into transmitting transducer and receiving transducer, converting the electrical signal sending from a controller via the touch screen cables into the acoustic wave energy and converting the surface acoustic wave energy gathered by reflective stripes into the electrical signal), and reflective stripes for reflecting the surface ultrasonic wave are scored on four sides of the screen. When figure(s) or soft object touches the screen, a part of energy of the acoustic wave is absorbed and then the received signals are changed. Therefore, X, Y coordinates of the touch point may be obtained through processing by a controller, so that the position where the touch point is in the screen and its moving track may be judged.

Of course, the touch acquisition module may further be implemented in other manners, but the implementing manner of the touch acquisition module does not affect the implementation of the present invention, because the area included in the touch acquisition modules implemented in any manners may be divided into two sub-areas.

<The Processing Module is a MCU>

The MCU is connected between the touch acquisition module and the mainboard.

Figure 6:
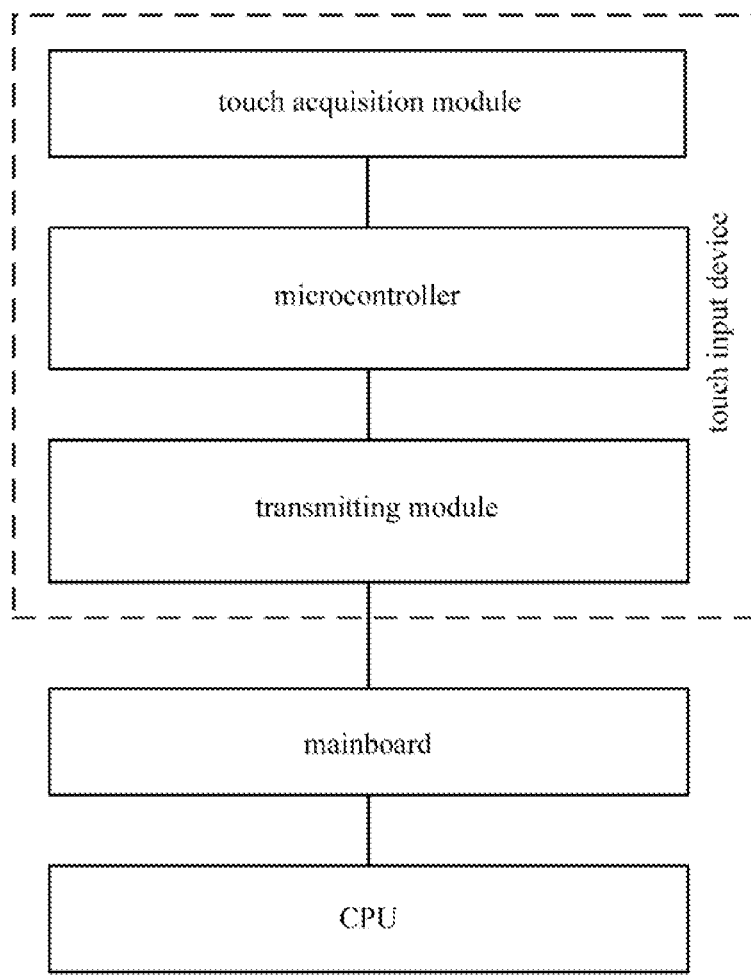
FIG. 6 is a schematic diagram illustrating the structures of the electronic device and a touch input device according to the second embodiment of the present invention.

An electronic device according to the embodiment of the present invention comprises a mainboard and a CPU disposed on the mainboard, and further comprises a touch input device, as shown in FIG. 6, the touch input device comprises:

a touch acquisition module having an input area, which performs the touch acquisition operation, the input area includes a first area and a second area;

a microcontroller, which performs a location operation to determine a start position of the touch operation according to the data acquired by the touch acquisition module, calculates a first result indicating coordinates of the pointing object according to the data acquired by the touch acquisition module and sends it to the CPU through the mainboard, when the start position of the touch operation is in the first area, and calculates a second result indicating an action of the pointing object according to the data acquired by the touch acquisition module and sends it to the CPU through the mainboard, when the start position of the touch operation is in the second area.

In the embodiment of the present invention, the microcontroller may further acquire an operation instruction corresponding to a preset action matched with the action of the pointing object, when the start position of the touch operation is in the second area.

When the electronic device has a display screen, a part of the touch acquisition module which is located in the first area is disposed overlapped with the display screen.

Figure 7:
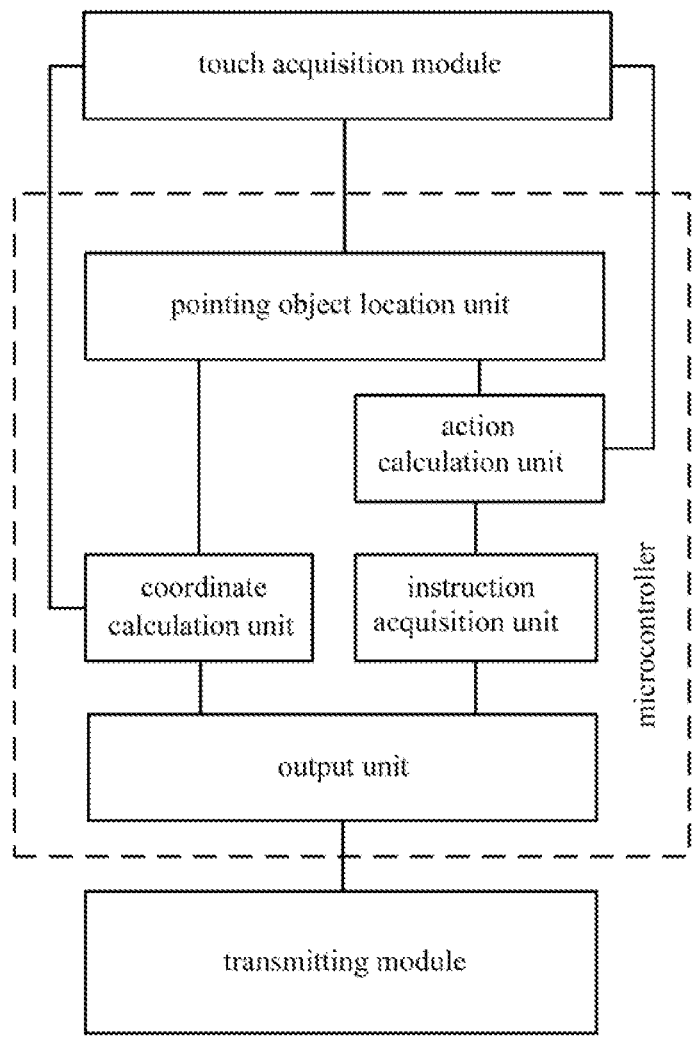
FIG. 7 is a schematic diagram illustrating a structure of a processing module in the second embodiment and a third embodiment of the present invention.

As shown in FIG. 7, the microcontroller may further comprise the following units:

a pointing object location unit for determining the start position of the touch operation according to the data acquired by the touch acquisition module;

a coordinate calculation unit for calculating the coordinates of the pointing object according to the data acquired by the touch acquisition module, when the start position of the touch operation is in the first area;

an action calculation unit for calculating the second result indicating the action of the pointing object according to the data acquired by the touch acquisition module, when the start position of the touch operation is in the second area;

an instruction acquisition unit for acquiring the operation instruction corresponding to the preset action matched with the action of the pointing object;

an output unit for sending the coordinates of the pointing object or the operation instruction to the CPU through the mainboard.

In the embodiment of the present invention, the microcontroller may further judge a corresponding touch mode according to the second result indicating the action of the pointing object, and determine the corresponding operation instruction according to a preset correspondence relationship between the touch mode and the operation instruction and perform the operation instruction.

In the embodiment of the present invention, the corresponding touch mode may be calculated in the following way: judging whether there is a movement track of the pointing object according to the second result indicating the action of the pointing object; if there is, determining this touch mode as a sliding and thus obtaining the touch mode corresponding to the track of this touching; if there is no movement track of the pointing object, judging whether a contact time period with a contact point is larger than a preset contact time period, determining the corresponding touch mode as a long-pressing if it is, otherwise determining the corresponding touch mode as a clicking; and after determining the touch mode as the clicking, determining the touch mode as a double-clicking when another clicking occurs during a preset spacing time period.

In the embodiment of the present invention, the corresponding operation instruction may be the operation instruction for implementing the function of the main interface key of the electronic device, when the touch mode is the sliding, the clicking, the long-pressing and/or the double-clicking.

In the embodiment of the present invention, the corresponding operation instruction may be the operation instruction for implementing a BACK function of the electronic device, when the touch mode is a leftward sliding.

An embodiment of the present invention further provides a separate touch input device for an electronic device, the electronic device having a mainboard and a CPU disposed on the mainboard, the touch input device comprises:

a touch acquisition module having an input area, which performs the touch acquisition operation, the input area includes a first area and a second area;

a microcontroller, which performs a location operation to determine a start position of the touch operation according to the data acquired by the touch acquisition module, calculates a first result indicating coordinates of the pointing object according to the data acquired by the touch acquisition module and sends it to the CPU through the mainboard, when the start position of the touch operation is in the first area, and calculates a second result indicating an action of the pointing object according to the data acquired by the touch acquisition module and sends it to the CPU through the mainboard, when the start position of the touch operation is in the second area.

When the electronic device has a display screen, a part of the touch acquisition module which is located in the first area is disposed overlapped with the display screen.

Meanwhile, in the detailed embodiment of the present invention, the judgment is based on the start position of the touch operation, thus the pointing object slides starting from the second area and stops until it reaches somewhere in the first area. At this time, the action calculation unit may calculate the second result indicating the action of the pointing object according to the data acquired by the touch acquisition module so as to acquire a correct gesture.

Since only pointing operations occur in the first area, no cases where an operation crosses the areas will appear.

Thereafter, applications of the present invention will be explained exemplarily.

<A Scene for Watching Pictures>

Given a correspondence relationship between the gestures and the instruction predefined as follows:

a gesture of sliding rightward corresponds "opening the next picture";

a gesture of sliding leftward corresponds "opening the previous picture";

a gesture of sliding upward corresponds "enlarging the current picture"; and a gesture of sliding downward corresponds "reducing the current picture".

When the finger of the user is in the first area, the CPU or MCU judges the area in which the start position of the touch operation is according to the acquired data at first, and if the start position of the touch operation is in the first area, the CPU or MCU calculates the coordinates of the pointing object and performs an operation for deleting the current picture if the current coordinates of the pointing object points to an icon of "deleting the current picture".

If the start position of the touch operation is in the second area, the CPU or MCU may calculate a movement track according to the acquired data. Assuming the movement track is sliding upward, the CPU or MCU may acquire the instruction for "enlarging the current picture", and such instruction is sent to the application by the CPU in order to realize an enlargement of the picture at last.

<A Scene for Accessing the Internet>

Given a correspondence relationship between the gestures and the instruction predefined as follows:

a gesture of sliding rightward corresponds "CONTINUE";

a gesture of sliding leftward corresponds "BACK";

a gesture of sliding upward corresponds "CLOSE".

When the finger of the user is in the first area, the CPU or MCU judges the area in which the start position of the touch operation is according to the acquired data at first, and if the start position of the touch operation is in the first area, the CPU or MCU calculates the coordinates of the pointing object and accesses a link "AAAAAA" if the current coordinates of the pointing object points to the link of "AAAAAA".

If the start position of the touch operation is in the second area, the CPU or MCU may calculate a movement track according to the acquired data. Assuming the movement track is sliding upward, the CPU or MCU may acquire the instruction for "CLOSE", and such instruction is sent to the application by the CPU in order to close the current page.

It can be seen from the above description that, only coordinates or only gesture is needed to be calculated and they two would not be calculated at the same time in either scene, therefore the unnecessary calculations can be avoided, in turn the utilization rates of the calculation resource and the power resource can be increased.

A mobile phone according to the embodiment of the present invention comprises a mainboard, a CPU disposed on the mainboard and a display screen connected to the mainboard, wherein it further comprises:

a touch acquisition module having an input area, which performs the touch acquisition operation, the input area includes a first area and a second area;

a microcontroller, which performs a location operation to determine a start position of the touch operation according to the data acquired by the touch acquisition module, directly sends the data acquired by the touch acquisition module to the CPU, which processes the data, through the mainboard, when the start position of the touch operation is in the first area; and calculates an action of the pointing object according to the data acquired by the touch acquisition module, acquires an operation instruction corresponding to a preset actions matched with the action of the pointing object and sends the operation instruction to the CPU, which performs an operation corresponding to the operation instruction according to the operation instruction, through the mainboard, when the start position of the touch operation is in the second area.

A part of the touch acquisition module which is located in the first area is disposed overlapped with the display screen.

The microcontroller may further comprise the following units:

a pointing object location unit for determining the start position of the touch operation according to the data acquired by the touch acquisition module;

an action calculation unit for calculating the action of the pointing object according to the data acquired by the touch acquisition module, when the start position of the touch operation is in the second area;

an instruction acquisition unit for acquiring the operation instruction corresponding to the preset action matched with the action of the pointing object;

an output unit for outputting the data acquired by the touch acquisition module to the CPU through the mainboard when the start position of the touch operation is in the first area, and for outputting the operation instruction to the CPU through the mainboard when the start position of the touch operation is in the second area.

In the embodiment of the present invention, the microcontroller may further obtain a corresponding touch mode according to the action of the pointing object by calculation, and determine the corresponding operation instruction according to a preset correspondence relationship between the touch mode and the operation instruction and perform the operation instruction.

In the embodiment of the present invention, the corresponding touch mode may be calculated in the following way: judging whether there is a movement track of the pointing object according to the action of the pointing object; if there is, determining this touch mode as a sliding and thus obtaining the touch mode corresponding to the track of this touching; if there is no movement track of the pointing object, judging whether a contact time period with a contact point is larger than a preset contact time period, determining the corresponding touch mode as a long-pressing if it is, otherwise determining the corresponding touch mode as a clicking; and after determining the touch mode as the clicking, determining the touch mode as a double-clicking when another clicking occurs during a preset spacing time period.

In the embodiment of the present invention, the corresponding operation instruction may be the operation instruction for implementing the function of the main interface key of the electronic device, when the touch mode is the sliding, the clicking, the long-pressing and/or the double-clicking.

In the embodiment of the present invention, the corresponding operation instruction may be the operation instruction for implementing a BACK function of the electronic device, when the touch mode is a leftward sliding.

The above mobile phone is described as follows.

The touch screen of the mobile phone is divided into two areas, A and B. When the user starts his/her operation from the A area, MCU performs no processing on the acquired data and sends it to the CPU directly, and the CPU processes the data in a normal manner. Regarding the operations starting from the B area by the user, the MCU calculates the gesture according to the acquired data, and sends an operation instruction to the CPU after determining the operation instruction according the corresponding gesture.

The calculation may start for gestures from the B area, so necessarily the gesture operations in the A area by the user could be reduced greatly, thus the data sent directly to the CPU among the date acquired by the touch acquisition module may also be reduced, which reduces the unnecessary calculation in the CPU and increases the utilization rates of the calculation resource and the power resource.

The above will be illustrated exemplarily.

Given a correspondence relationship between the gesture and the instruction predefined as follows:

a clicking corresponds to an instruction for invoking a main interface of the mobile phone, which is equal to a press of the main interface key on the mobile phone.

The MCU judges the area in which the start position of the touch operation is according to the acquired data at first, and if the start position of the touch operation is in the first area, the MCU calculates the coordinates of the pointing object and sends the same to the CPU. The operation corresponding to the current coordinates of the pointing object is calculated by the CPU, for example, it calculates an icon of an application corresponding to the coordinates according the coordinates of the pointing object and opens the application; alternately, it calculates a corresponding gesture according to a movement track of the pointing object, then determines an operation in the current application corresponding to the gesture, and performs the operation (in a case of watching pictures, a gesture of sliding in one direction corresponds to an operation for going through the pictures).

If the start position of the touch operation is in the second area, the MCU may calculate it as a clicking operation according to the acquired data, determine the instruction for invoking the main interface of the mobile phone according to the clicking operation, and send the instruction for invoking the main interface of the mobile phone to the CPU. After receiving the instruction, the CPU invokes the main interface of the mobile phone and displays the same according to the instruction. Obviously, those skilled in the art can understand that there may be various gesture operations made in the second area. Different gesture operations correspond to different operation instruction, for example, in the above example, clicking corresponds to the instruction for invoking a main interface of the mobile phone (that is, equal to an effect of pressing the main interface key on the mobile phone); as another example, circling in the second area corresponds to an instruction of powering off, and so on. Also, several gestures may correspond to one operation instruction, for example, any gestures in the second area may correspond to the instruction for invoking the main interface of the mobile phone, or any gestures in the second area may correspond to the instruction for powering off, etc.

An embodiment of the present invention further discloses a method for an electronic device, wherein the electronic device comprises a touch acquisition module having an input area, which performs the touch acquisition operation, the input area includes a first area and a second area; wherein the method comprises: calculating a first result indicating coordinates of the pointing object according to the data acquired by the touch acquisition module, when a start position of the touch operation is in the first area, and calculating a second result indicating an action of the pointing object according to the data acquired by the touch acquisition module, when the start position of the touch operation is in the second area.

In the embodiment of the present invention, an operation instruction corresponding to a preset actions matched with the action of the pointing object may be acquired, when the start position of the touch operation is in the second area.

In the embodiment of the present invention, a corresponding touch mode may be obtained according to the action of the pointing object by calculation, and the corresponding operation instruction may be determined and performed according to a preset correspondence relationship between the touch mode and the operation instruction.

In the embodiment of the present invention, the corresponding touch mode may be calculated in the following way:

judging whether there is a movement track of the pointing object according to the second result indicating the action of the pointing object; if there is, determining this touch mode as a sliding and thus obtaining the touch mode corresponding to the track of this touching; if there is no movement track of the pointing object, judging whether a contact time period with a contact point is larger than a preset contact time period, determining the corresponding touch mode as a long-pressing if it is, otherwise determining the corresponding touch mode as a clicking; and after determining the touch mode as the clicking, determining the touch mode as a double-clicking when another clicking occurs during a preset spacing time period.

In the embodiment of the present invention, the corresponding operation instruction may be the operation instruction for implementing the function of the main interface key of the electronic device, when the touch mode is the sliding, the clicking, the long-pressing and/or the double-clicking.

In the embodiment of the present invention, the corresponding operation instruction may be the operation instruction for implementing a BACK function of the electronic device, when the touch mode is a leftward sliding.

In the embodiment of the present invention, a part of the touch acquisition module which is located in the first area is disposed overlapped with the display screen.

An embodiment of the present invention further provides a program which causes an electronic device to perform the above steps, and the details are omitted.

Figure 8:
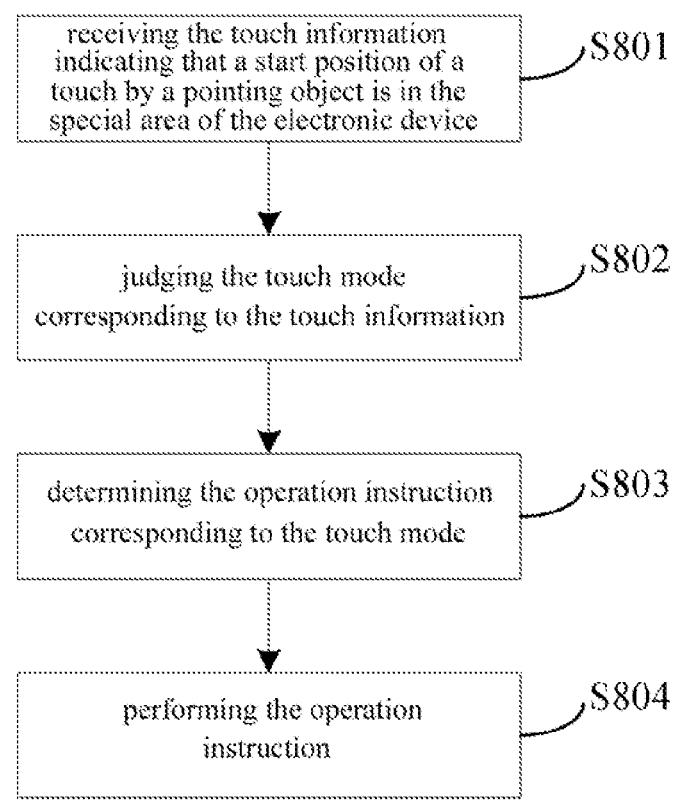
FIG. 8 is a flowchart of a method for implementing the present operations in the special area of the electronic device disclosed in the embodiment of the present invention.

A flowchart of the method for implementing the preset operations in the special area of the electronic device disclosed in the embodiments of the present invention is as shown in FIG. 8. The electronic device includes a touch acquisition module and a display screen, the touch acquisition module is configured to have an input area divided into a first area superposing with the display screen and a second area. The appliance scope of the present invention is the second area of the input area, i.e., the special area is the second area, and the second area is not superposed with the display screen and is disposed with no physical function keys therein.

Step S801: receiving the touch information indicating that a start position of a touch by a pointing object is in the special area of the electronic device. Here, it may avoid a case where the touch information is also acquired even when the start position of the pointing object is not in the special area but its touch track reaches to the special area, by limiting the start position of the pointing object to the special area. Thus the calculation resource may be saved. On the contrary, if the touch track goes beyond the special area, the touch information will still be acquired as long as the touch start position thereof is in the special area. This step setups a standard for judging the touch information, which improves the accuracy of acquiring information.

S802: judging the touch mode corresponding to the touch information. The touch mode should be judged at first because of the uncertainty of the gesture operation. There are many methods for judging the touch mode, and one can select a most suitable one depending on the detailed application environment as designing. However, the selection of the judging method does not affect the protection scope of the present invention.

S803: determining the operation instruction corresponding to the touch mode according to a preset correspondence relationship between the touch modes and the operation instruction. Those skilled in the art can understand that, the correspondence relationship between the touch mode and the operation instruction may be set according to user's own preferences, and also may be set according to the corresponding requirements or usage during a design process by a designer. How to set the correspondence relationship would not affect the protection scope of the present invention either.

S804: performing the operation instruction.

According to the method for implementing the preset operations in the special area of the electronic device disclosed in the embodiment of the present invention, the corresponding functions could be implemented by only making the corresponding touch operations in the special area. That is to say, without disposing the physical keys on other positions outside the display screen or touch screen as in the prior art, the shortcut-key function corresponding to a gesture could be implemented as long as making the corresponding gesture operation in the special touch area of the electronic area, so as to implement the operation of the corresponding shortcut-keys function. Since no physical key is needed, the operable scope of the user's gestures is increased as compared with the prior art. For example, if one wants to implement the function of a certain shortcut-key, instead of clicking the position of the corresponding shortcut-key, he/she could make corresponding gesture operation in a large touch area. Since the position of the gesture operation could be any position in the specified touch area, the operation flexibility is improved.

Figure 9:
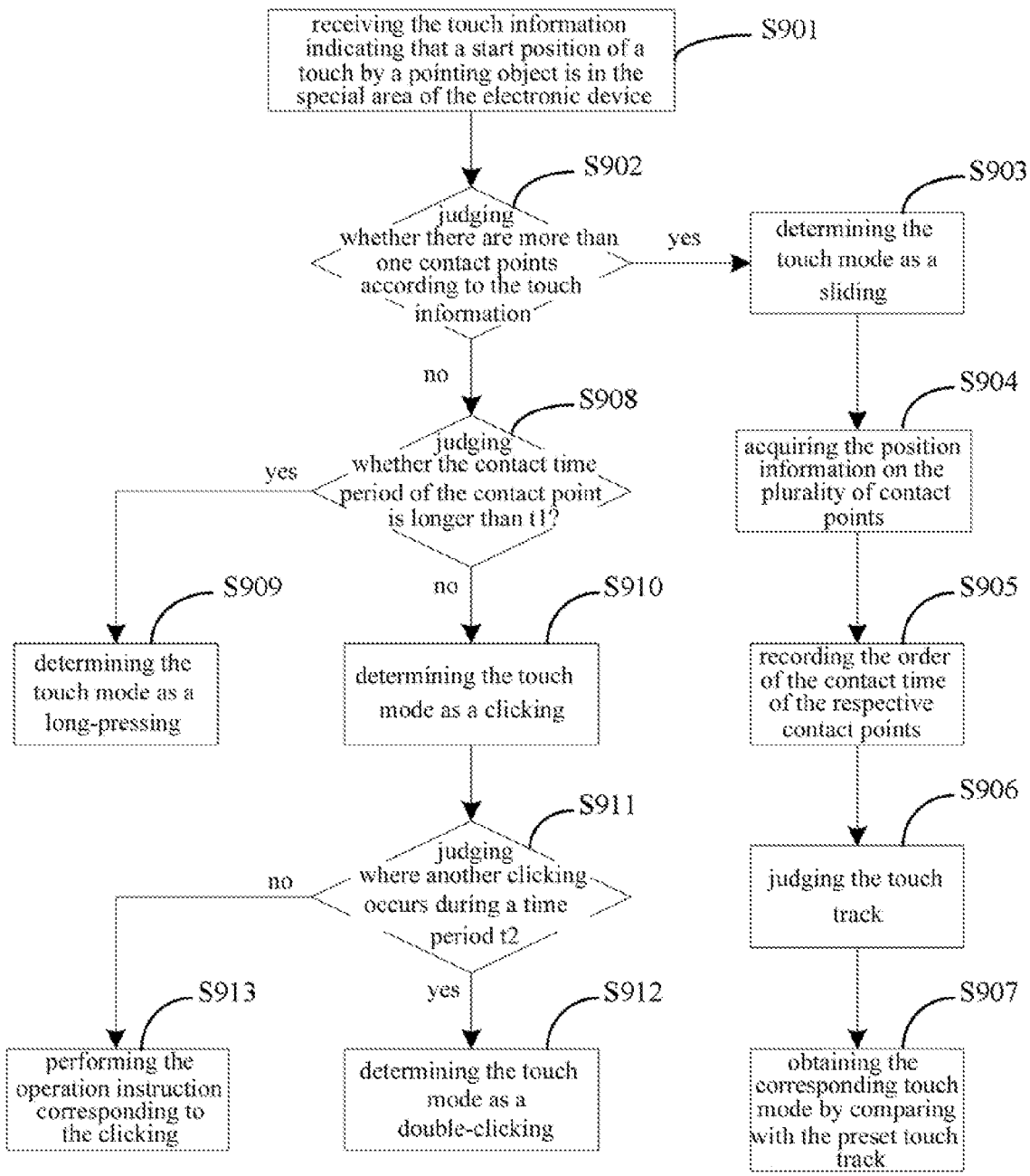
FIG. 9 is a flowchart of judging the touch mode disclosed in the embodiment of the present invention.

Based on the above-described method for implementing preset operations in a special area of an electronic device, there are many schemes to judge the touch mode according to the touch information in the step S802 and determine the preset operation corresponding to the touch mode during a program design process. Below is illustrated by way of example, and the flowchart for judging the touch mode corresponding to the touch information is as shown in FIG. 9, wherein the flowchart may comprise the steps as follows.

Step S901: receiving the touch information indicating that a start position of a touch by a pointing object is in the special area of the electronic device.

Step S902: judging whether there is a movement track of the pointing object according to the touch information. Particularly, judging whether there are more than one contact points according to the touch information, if yes, the process goes to step S903, and if not, the process goes to step S908.

Step S903: determining the touch mode as a sliding. Thereafter, it is needed to further determine how the detailed movement track of the pointing object is, so the process goes to next step.

Step S904: acquiring the position information on the plurality of contact points, that is, acquiring the coordinates information on the respective contact points.

Step S905: recording the order of the contact time of the respective contact points with the pointing object.

Step S906: connecting the respective contact points together according to the position information and the order of the plurality of the contact points, and in turn obtaining the movement track of the pointing object.

Step S907: obtaining a touch mode corresponding to this touch track by comparing this movement track of the pointing object with the preset touch track.

Step S908: if this touch of the pointing object only has a single contact point, judging whether the contact time period of the contact point with the pointing object is longer than a preset time period $t_1$, if yes, the process goes to step S909, and if not, the process goes to step S910.

Step S909: if the contact time period of the single contact point with the pointing object exceeds the preset time period $t_1$, determining this touch mode as a long-pressing.

Step S910: if the contact time period of the single contact point with the pointing object is within a range of a preset time period, determining this touch mode as a clicking.

Step S911: after determining the touch mode as the clicking, judging where there is a second click occurs during a preset interval $t_2$ after the clicking, if yes, the process goes to step S912, and if not, a step S913 would be performed.

Step S912: determining this touch mode as a double-clicking if a second click occurs during the time period $t_2$.

Step S913: determining this touch mode as a single clicking if no further click occurs during the time period $t_2$, and performing the operation instruction corresponding to the clicking.

In order to enable the user to be clearly aware of the preset time period $t_1$, and the preset interval $t_2$ designed by the system to perform his/her required operation instruction more properly, the present embodiment may light an indicator light lying in the special area after determining the touch mode as the clicking, but the indicator light would not be lighted if the touch mode is a long-pressing. From the point of view of the user, the indicator light is lighted to inform the user that this click is the clicking when the time period during which the pointing object contacts with the special area does not exceed the preset time period $t_1$. Meanwhile, the indicator light is maintained to be lighted for the preset interval $t_2$, if the user clicks the special area again before the indicator light is black, then determining this touch operation as the double-clicking, performing the operation instruction corresponding to the double-clicking and turning off the indicator light; if the user does not click the special area again before the indicator light is black, then determining this touch operation as a single clicking and performing the operation instruction corresponding to the clicking; and if the user clicks the special area again after the indicator light is black, this touch operation is only regarded as a first clicking, and so on. It is more convenient to the user due to the added indicator light in the present embodiment.

Furthermore, the present embodiment sets all of the operation instructions corresponding to the touch modes of sliding, clicking, long-pressing and/or double-clicking as those for implementing the functions of the main interface key of the electronic device. That is, the operations with the start position in the special area of the electronic device are used for performing the functions of the main interface key.

The corresponding operation instruction is the operation instruction for implementing a BACK function of the electronic device, when the touch mode is a leftward sliding.

Those skilled in the art can understand that the preset time period $t_1$ and the preset interval $t_2$ may be set by designers or users, and if it is the latter case, the user may set the above time periods as longer or shorter freely according to his/her own operating habits on a edit plat provided by the designers. One can select a most suitable setting manner according to an actual situation. Further, the operation instructions corresponding to the various touch modes may also be set by the designers or users, and those skilled in the art may make the detailed designs for the detailed setting manner and steps according to the actual situation. Every design derived from the concept of the present invention will fall into the scope sought for protection of the embodiments thereof.

It is to note that a manner of extracting points from the touch track is used for judging the detailed touch mode during the process for judging the touch mode, the detailed judging process thereof is explained as follows by way of example.

Figure 10:
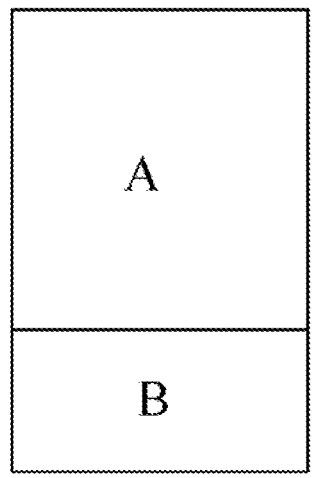
FIG. 10 is a schematic diagram illustrating the electronic device disclosed in the embodiment of the present invention in an upright position.
Figure 11:
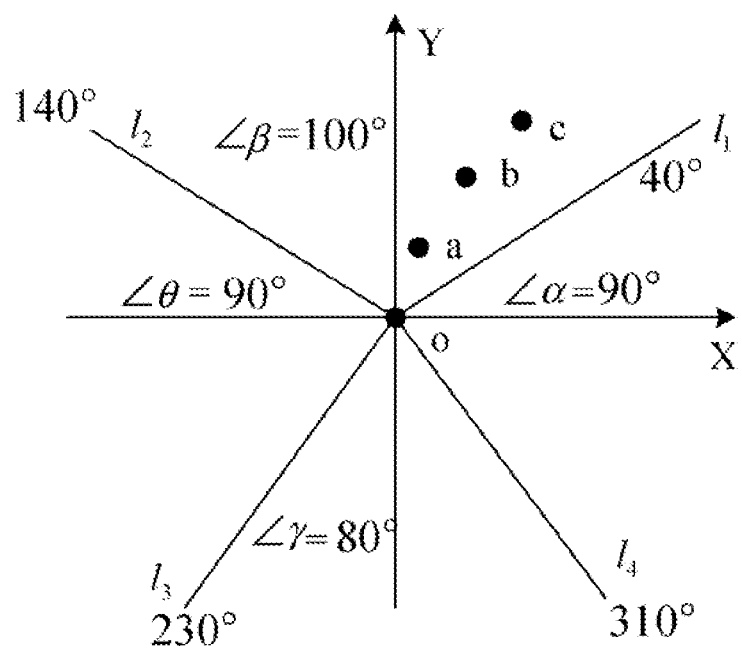
FIG. 11 is a schematic diagram illustrating a coordinate system established when the electronic device disclosed in the embodiment of the present invention is in the upright position.

Referring to FIGS. 10 and 11, FIG. 10 shows an electronic device, wherein A area is a display screen area and B area is the special area described in the above embodiment. Referring to FIG. 11, taking four points o, a, b, and c from a touch track, then an order that the pointing object contacts with the four points is known as o→a→b→c by calculation, that is, the point o is the contact point which is firstly contacted. Then, making the point o as an origin and building a Cartesian coordinate system (or rectangular coordinate system) according to a placement direction of the electronic device. Particularly, a coordinate system as shown in FIG. 11 is built according to the placement in FIG. 10. This coordinate system is divided into four regions by half-lines $l_1$, $l_2$, $l_3$ and $l_4$, wherein an angle between the $l_1$ and the positive direction of X axis is 40°, an angle between the $l_2$ and the positive direction of the X axis is 140°, an angle between the $l_3$ and the positive direction of the X axis is 230°, and an angle between the $l_4$ and the positive direction of the X axis is 310°, that is, the angle between $l_1$ and $l_2$ is <β=100°, the angle between $l_2$ and $l_3$ is <θ=90°, the angle between $l_3$ and $l_4$ is <γ=80°, and the angle between $l_4$ and $l_1$ is <α=90°. In the present embodiment, it is set that a touch track of the pointing object represents sliding upward if it is within the angle scope between $l_1$ and $l_2$, represents sliding leftward if it is within the angle scope between $l_2$ and $l_3$, represents sliding downward if it is within the angle scope between $l_3$ and $l_4$, and represents sliding rightward if it is within the angle scope between $l_4$ and $l_1$. All of the directions discussed herein are relative directions with respect to the display screen. After determining the touch track, a corresponding operation according to a preset correspondence relationship between directions of gestures and operation instruction is performed, as shown in the figure, i.e., an operation corresponding to the gesture upward is performed.

Figure 12:
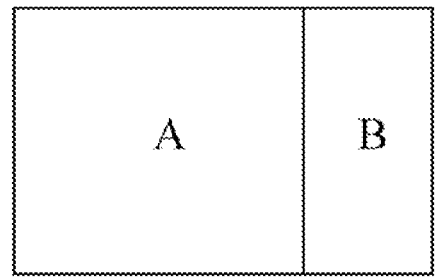
FIG. 12 is a schematic diagram illustrating the electronic device disclosed in the embodiment of the present invention in a horizontal position.
Figure 13:
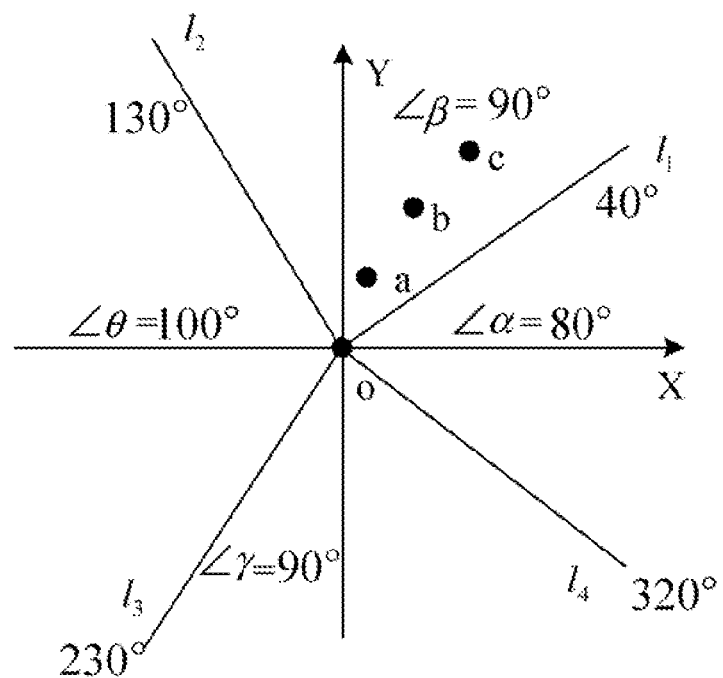
FIG. 13 is a schematic diagram illustrating a coordinate system established when the electronic device disclosed in the embodiment of the present invention is in the horizontal position.

If the electronic device is rotated by 90° anticlockwise, as shown in FIG. 12, the built coordinate system is accordingly as shown in FIG. 13. With the same touch mode o→a→b→c and same gesture upward, the regions are different. The coordinate system is also divided into four regions by half-lines $l_1$, $l_2$, $l_3$, and $l_4$, wherein an angle between the $l_1$ and the positive direction of the X axis is 40°, an angle between the $l_2$ and the positive direction of the X axis is 130°, an angle between the $l_3$ and the positive direction of the X axis is 230°, and an angle between the $l_4$ and the positive direction of the X axis is 320°, that is, the angle between $l_1$ and $l_2$ is <β=90°, the angle between $l_2$ and $l_3$ is <θ=100°, the angle between $l_3$ and $l_4$ is <γ=90°, and the angle between $l_4$ and $l_1$ is <α=80°. Specifying the same directions as in FIG. 11, and the corresponding operation is performed after the direction of sliding is determined.

When the electronic device is placed in any states, a corresponding coordinate system may be accordingly designed and the directions of sliding may be accordingly specified. For example, if the touch track represents cycling in the special area, its judging method is similar to the above method.

It is to note that, in a case that the touch mode is calculated by taking some points from the touch track of the pointing object above-described, a distance between the adjacent points should be larger than a certain distance range so as to avoid erroneous judgment when the user makes clicking or double-clicking. A case of uneven force may occur when a user clicks the special area, such that the system might acquire a plurality of points for one clicking. The touch range of one clicking is limited, that is, the distances among this plurality of focal points are limited to a certain range, those skilled in the art should pay attention to this during design.

Those skilled in the art can also understand that, the angles and region ranges disclosed in the this embodiment is only an optional design, and those skilled in the art may arbitrarily design the angles and region ranges, which falls into the scope sought for protection of the present invention, without any inventive labors. Further, the manner for building the coordinate system may be selected arbitrarily, for example, a polar coordinate system can also be built other than the rectangular coordinate system, wherein only the ways for representing the directions are according changed, such as utilizing a tangent value of an angle with a position direction of the polar axis. Those skilled in the art may properly design any detailed implementations, and such implementations fall into the scope sought for protection of the invention.

An embodiment of the present invention further discloses a problem causing an electronic device to perform the above-described steps, its details are omitted.

Figure 14:
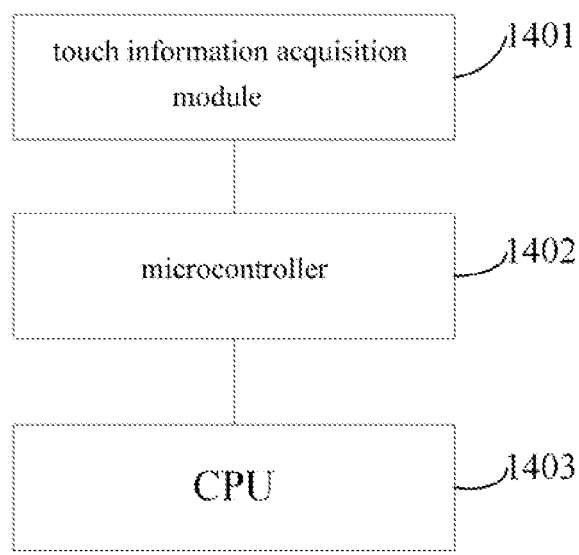
FIG. 14 is a schematic diagram illustrating a structure of the electronic device disclosed in the embodiment of the present invention.

Corresponding to the above method, an embodiment of the present invention further discloses an electronic device, as shown in FIG. 14, comprising: a touch acquisition module 1401 being configured to have an input area, which acquires the touch information in the input area, the input area includes a first area superposed with a display screen and a second area only used for touch operation but not for displaying; a microcontroller 1402 connected with the touch acquisition module 1401, which obtains a corresponding touch mode according to the data acquired by the touch acquisition module 1401 by calculation, and determines the corresponding operation instruction according to a preset correspondence relationship between the touch modes and the operation instruction and sends the same to a CPU 1403 which receives and performs the preset operation instruction, when the start position of the touch operation is in the second area.

There are many manners for dividing the input area disclosed in this embodiment, as shown, but not limited to, in the above FIG. 5. In FIG. 5, the first areas in both figures are superposed with the display while the second areas are used only to acquire the touch information but not to display images, no physical function key is disposed in the second area. Instead, the functions of the corresponding operation instruction may be implemented only by the touch operation, that is, the corresponding shortcut-key function may be implemented as long as the corresponding gesture operation is made in the second area. The detailed implementing process is controlled by the microcontroller.

Figure 15:
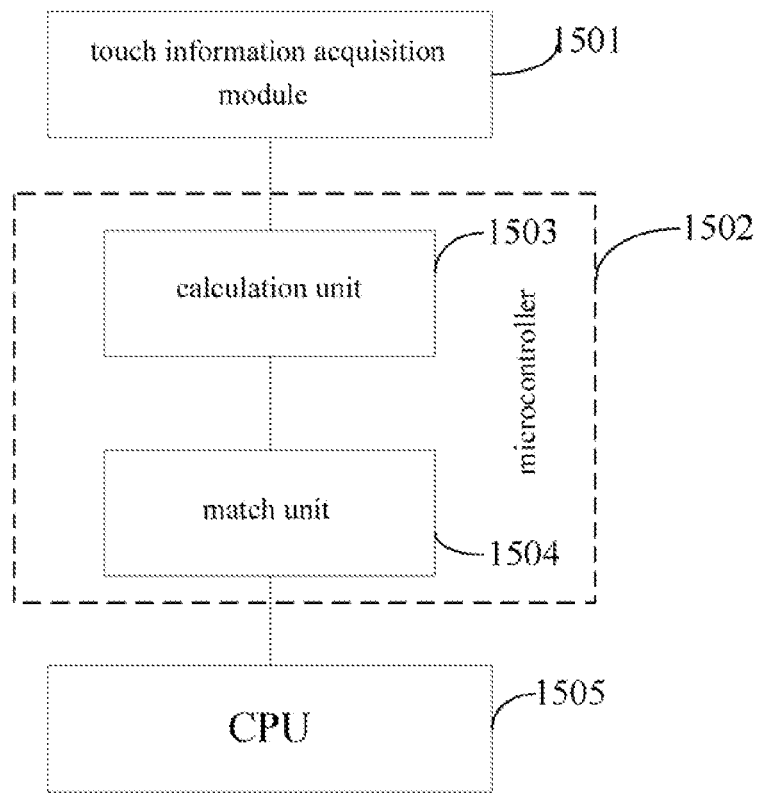
FIG. 15 is a schematic diagram illustrating a structure of the electronic device disclosed in another embodiment of the present invention.

Another embodiment of the present invention is shown in FIG. 15. The units having the same name as that in FIG. 14 have the same functions, and their differences lie in that the function of the microcontroller 1502 is accomplished through the calculation unit 1503 and the match unit 1504, wherein the calculation unit 1503 is used to obtain the corresponding touch mode according to the data acquired by the touch acquisition module 1501 by calculation, when the start position of the touch operation is in the second area; and the match unit 1504 is used to obtain the preset operation instruction corresponding to the touch mode according to the touch mode obtained by the calculation unit 1503 by match and send the corresponding operation instruction to CPU 1505 for performing thereafter.

It is to note that, there are many methods for the calculation unit 1503 to obtain the corresponding touch mode according to the click manner of the touch action by the pointing object or its movement track, either the calculation method in the above method embodiment may be used, or a method of scanning or tracking the movement of the pointing object may be used. Any method which can obtain the touch mode would fall into the scope sought for protection of the present invention.

Figure 16:
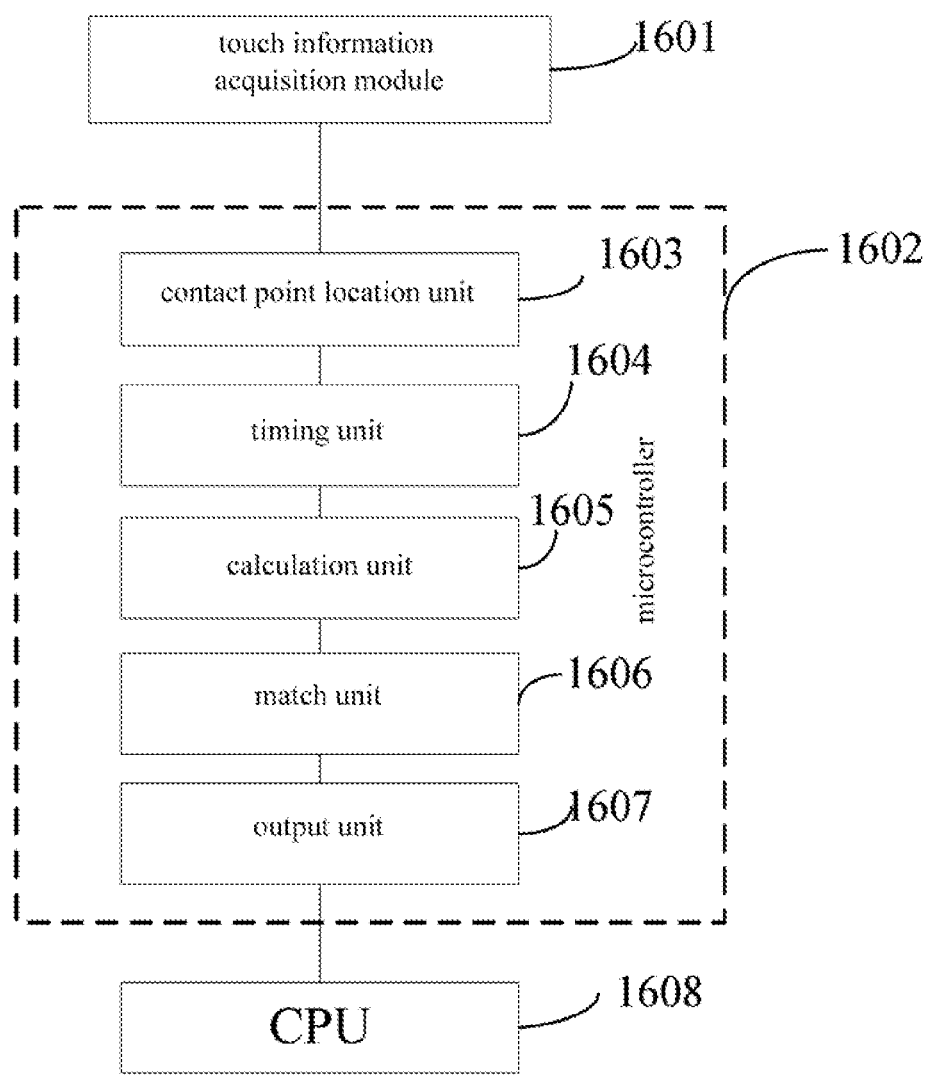
FIG. 16 is a schematic diagram illustrating a structure of the electronic device disclosed in another embodiment of the present invention.

Corresponding to the above method embodiment, the structure of an electronic device according to another embodiment of the present invention is as shown in FIG. 16, and the units in FIG. 16 having the same name as that in FIG. 15 have the same functions. The microcontroller 1602 in this embodiment may comprise:

a contact point location unit 1603 for determining a position of the contact point according to the data acquired by the touch acquisition module 1601, when there are a plurality of contact points, building a coordinate system, either a rectangular coordinate system or a polar coordinate system, with the first contact point as the origin, then determining the coordinates values of the respective contact points according to a relative position between the other contact points with the origin, the detailed operating method is as described in the above method embodiment; to the contrary, when there is a single contact point, only the position of the intended point is needed to be determined;

a timing unit 1604 for recording a contact time period during which a pointing object contacts with the touch acquisition module 1601 when there is a single contact point, the timing unit 1604 may be used to judge whether this click is a long-pressing or only a single clicking by comparing with a preset time period, it is the long-pressing if the time period recorded by the timing unit 1604 is longer than the preset time period, otherwise, it is the clicking; and for determining an order of the respective contact points by recording a contact time of the respective contact points with the touching acquisition unit 1601 when there are a plurality of contact points, and thereafter a calculation unit 1605 may judge the touch track of the pointing object according to the records of the timing unit 1604;

an output unit 1607 for outputting the preset operation instruction obtained by match to the CPU 1608 to be performed, after the calculation unit 1605 obtains the touch mode by calculation and the match unit 1606 obtains the preset operation instruction corresponding to the touch mode, when the first contact point is located in the special area of the electronic device.

Please note, the function of the contact point location unit 1603 may be the same or not the same as that of the pointing object location unit mentioned above, and their functions may be replaced with each other in some cases, but may not in other cases.

In the electronic device disclosed in the embodiments of the present invention, when the user operates in the second area, the operation instruction corresponding to various touch modes, such as double-clicking, clicking, long-pressing and/or sliding, may be designed selectively, while the corresponding operation instruction are those for implementing the function of the main interface key of the electronic device or those corresponding to various touch modes designed by the user by himself/herself.

Further, the corresponding operation instruction may be the operation instruction for implementing a BACK function of the electronic device, when the touch mode is a leftward sliding.

In the particular embodiments of the present invention, the touch acquisition module may be a Capacitance type, an Infrared rays type, a Resistance type, an SAW (Surface Acoustic Wave) type, and so on. The related contents have been described previously, details are omitted.

Of course, the touch acquisition module may be implemented in other ways, but its implementation will not affect the implementation of the present invention, because the area included in the touch acquisition module realized in any way may be divided into two sub-areas.

In the electronic device disclosed in the embodiments of the present invention, the user may implement the preset operation instruction in the second area by means of touch operations, and any corresponding gesture operation made in the second area may implement the corresponding function of the shortcut-keys. Therefore, there is no need to dispose a physical key in the second area in the above-described embodiments. On the one hand, since no physical key is needed in the second area, a larger operable space is provided for the user's gestures operations and the operation flexibility is improved; on the other hand, since the functions of the shortcut-keys corresponding to the respective gesture operations may be designed by the user or designers, it can be more customized.

The present invention also discloses a mobile phone, comprising a mainboard, a CPU disposed on the mainboard and a display screen connected to the mainboard, further comprising:

a touch acquisition module being configured to have an input area, which acquires the touch information in the input area, the input area includes a first area superposed with the display screen and a second area;

a microcontroller, which obtains a corresponding touch mode according to the data acquired by the touch acquisition module by calculation, obtains a preset operation instruction corresponding to the touch mode by match, and sends the preset operation instruction to the CPU through the mainboard so that the CPU responds with an operation corresponding to the preset operation instruction according to the preset operation instruction, when the start position of the touch operation is in the second area.

Wherein, the microcontroller may comprise units as follows:

a contact point location unit for determining a position of the contact point according to the data acquired by the touch acquisition module;

a timing unit for recording a contact time period during which a pointing object contacts with the touch acquisition module when there is one contact pointing object and recording an order of the respective contact points when there are multiple contact points;

a calculation unit for calculating the touch mode according to the data acquired by the touch acquisition module, when the start position of the touch operation is in the second area;

a match unit for obtaining the preset operation instruction corresponding to the touch mode according to the touch mode by match; and an output unit for outputting the preset operation instruction to the CPU to perform, when the contact point is located in the second area.

The touch mode is double-clicking, clicking, long-pressing and/or sliding, and the corresponding operation instruction may be the operation instruction for implementing the function of the main interface key of the electronic device. Furthermore, the corresponding operation instruction may be the operation instruction for implementing a BACK function of the electronic device, when the touch mode is a leftward sliding.

Below will describe the function and operating method of the mobile phone disclosed in this embodiment by way of example.

Figure 17:
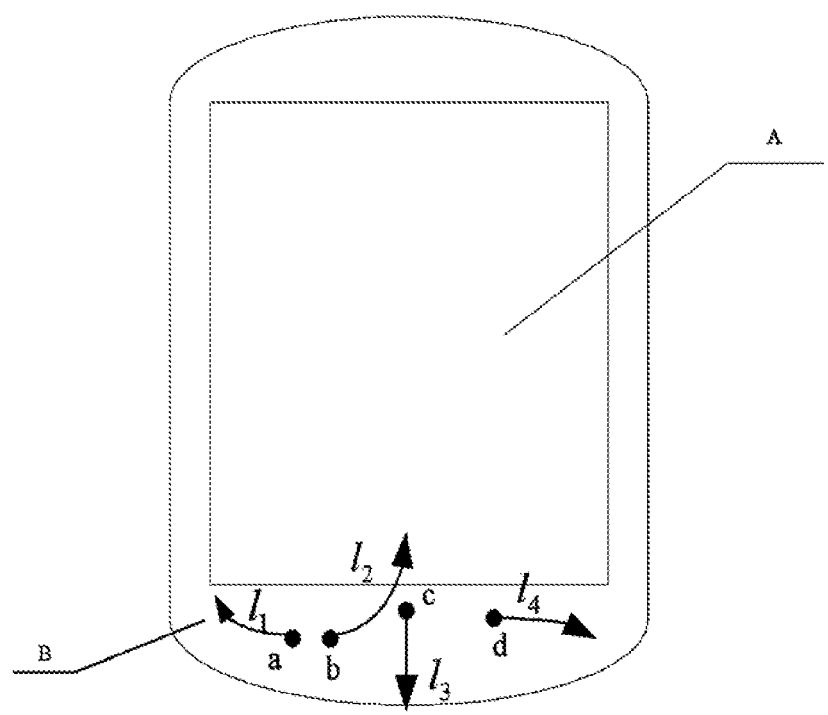
FIG. 17 is a schematic diagram illustrating a structure of a mobile phone disclosed in the embodiment of the present invention.

As shown in FIG. 17, an area A in the figure is the first area part in the input area of the touch acquisition module of the mobile phone, which is superposed with a display screen and is operated by touching to display the corresponding contents.

An area B is the second area in the input area mentioned in the embodiments of the present invention, which has no displaying function. The user may make touch operations in the area B in any manners and sets functions of the shortcut-keys corresponding to the respective gestures according to his/her own usage habit, or the designer could design the functions according to the actual situation. The internal system of the mobile phone may judge which gesture operation is performed according to the acquired touch information (i.e., gesture information) and then perform corresponding function of the shortcut-key according to the preset correspondence relationship.

Thereafter, an explanation is made for various operations by referring to FIG. 17.

Curves $l_1$, $l_2$, $l_3$, and $l_4$ in the figure represent certain operating gestures of the user, points a, b, c and d on the curves represent the first contact points of the respective operating gestures, which may be in arbitrate positions in the area B. According to the judging method in the above method embodiments, it can be known that $l_1$ represents sliding leftward, $l_2$ represents sliding upward, $l_3$ represents sliding downward and $l_4$ represents sliding rightward. Assuming the designer or user make the following settings to the mobile phone:

performing the function of BACK key, for the gesture having a track as curve $l_1$ (sliding leftward);

performing the function of MENU key, for the gesture having a track as curve $l_2$ (sliding upward);

performing the function of editing short message in the mobile phone, for the gesture having a track as curve $l_3$ (sliding downward); and performing the function of display a calendar, for the gesture having a track as curve $l_4$ (sliding rightward);

performing the function of main interface keys (displaying the main interface) if any position in the area B is double-clicked; and powering on/off the mobile phone if cycling in the area B.

The operations of the functions of corresponding shortcut-keys may be performed as long as the above gesture operations are made at any position in the area B by the user. Of course, it can also be set that the corresponding operation instruction is those for implementing the function of main interface key in the mobile phone when the gesture is double-clicking, clicking, long-pressing and/or sliding.

During the double-clicking operation, similar to the method embodiment, the mobile phone in this embodiment may light an indicator light lying in the area B after a clicking operation, and turn off the indicator light after a preset interval lapses or when a second clicking occurs during the preset interval, that is, a double-clicking operation is accomplished, and then the function of the main interface key is performed. Adding the display of the indicator light enables user to have a clearer visual feedback to his/her operations, which makes the usage more convenient comfortable.

Since no physical key is needed in the area B in the mobile phone disclosed in this embodiment, the user could make gesture operations in arbitrary position in the area B and perform the corresponding function of the shortcut-key, the operation flexibility is improved.

Those skilled in the art can clearly understand that, the units and steps of the respective examples described in the embodiments disclosed in the specification may be implemented by electronic hardware, computer software or combination thereof. In order to explain clearly the interchangeability between the hardware and software, the constitutions and steps of the respective examples are described generally with respect to their functions in the above description.

Whether using hardware or software to realize these functions is depending on the restrictions for particular application and design of the solution. Those skilled in the art may use different schemes to realize the described functions for each particular application, while such implementation is not constructed as exceeding the scope of the present invention.

The embodiments of the present application may be applied to a telephone handset, a Personal Digital Assistant, a notebook, a game machine, a video camera and other apparatus having a touch screen function.

The above description for the disclosed embodiments enables those skilled in the art to implement or use the present invention. Various amendments to these embodiments are obvious to those skilled in the art, and the general principle defined in the specification may be realized in other embodiments without deviating from the spirit or scope of the present invention. Therefore, the present invention is not limited to the embodiments shown in this specification.

What is claimed is:

1. An electronic device, comprising:
    a touch acquisition module having an input area, which performs a touch acquisition operation, the input area includes a first area and a second area;
    a processing module, which calculates a first result indicating coordinates of a pointing object according to data acquired by the touch acquisition module, when a start position of a touch operation is in the first area, and calculates a second result indicating an action of the pointing object according to the data acquired by the touch acquisition module, when the start position of the touch operation is in the second area,
    the electronic device further comprising a mainboard and a central processing unit (CPU) disposed on the mainboard, wherein, the processing module is a microcontroller, and the microcontroller is connected to the mainboard and sends the first result or the second result to the CPU through the mainboard;
    the microcontroller further comprising a pointing object location unit for determining the start position of the touch operation according to the data acquired by the touch acquisition module;
    a coordinate calculation unit for calculating the coordinates of the pointing object according to the data acquired by the touch acquisition module, when the start position of the touch operation is in the first area;
    an action calculation unit for calculating the second result indicating the action of the pointing object according to the data acquired by the touch acquisition module, when the start position of the touch operation is in the second area;
    an instruction acquisition unit for acquiring the operation instruction corresponding to preset action matched with the action of the pointing object; and
    an output unit for sending the coordinates of the pointing object or the operation instruction to the CPU through the mainboard.

2. The electronic device according to claim 1, wherein, the processing module further acquires an operation instruction corresponding to a preset action matched with the action of the pointing object, when the start position of the touch operation is in the second area.

3. The electronic device according to claim 1, further comprising:
    a display screen; and
    wherein, a part of the touch acquisition module which is located in the first area is disposed overlapping with the display screen.

4. The electronic device according to claim 1, wherein:
    the processing module further judges a corresponding touch mode according to the second result indicating the action of the pointing object, as well as determines and performs the corresponding operation instruction according to a preset correspondence relationship between the touch mode and the operation instruction.

5. The electronic device according to claim 4, wherein the corresponding operation instruction is the operation instruction for implementing the function of the main interface key of the electronic device, when the touch mode is the sliding, the clicking, the long-pressing and/or the double-clicking.

6. A mobile phone comprising a mainboard, a CPU disposed on the mainboard and a display screen connected to the mainboard, and further comprising:
    a touch acquisition module having an input area, which performs a touch acquisition operation, the input area includes a first area and a second area;
    a microcontroller, which performs a location operation to determine a start position of a touch operation according to data acquired by the touch acquisition module, directly sends the data acquired by the touch acquisition module to the CPU, which processes the data, through the mainboard, when the start position of the touch operation is in the first area; and calculates an action of the pointing object according to the data acquired by the touch acquisition module, acquires an operation instruction corresponding to a preset action matched with the action of the pointing object and sends the operation instruction to the CPU, which performs an operation corresponding to the operation instruction according to the operation instruction, through the mainboard, when the start position of the touch operation is in the second area,
    the microcontroller further comprising:
        a pointing object location unit for determining the start position of the touch operation according to the data acquired by the touch acquisition module;
        a coordinate calculation unit for calculating the coordinates of the pointing object according to the data acquired by the touch acquisition module, when the start position of the touch operation is in the first area;
        an action calculation unit for calculating the second result indicating the action of the pointing object according to the data acquired by the touch acquisition module, when the start position of the touch operation is in the second area;
        an instruction acquisition unit for acquiring the operation instruction corresponding to preset action matched with the action of the pointing object; and
    an output unit for sending the coordinates of the pointing object or the operation instruction to the CPU through the mainboard.

7. The mobile phone according to claim 6, wherein a part of the touch acquisition module which is located in the first area is disposed overlapping with the display screen.

8. The mobile phone according to claim 6, wherein:
    the microcontroller further obtains a corresponding touch mode according to the action of the pointing object by calculation, as well as determines and performs a corresponding operation instruction according to a preset correspondence relationship between the touch mode and the operation instruction.

9. The mobile phone according to claim 8, wherein the corresponding operation instruction is the operation instruction for implementing the function of the main interface key of the electronic device, when the touch mode is the sliding, the clicking, the long-pressing and/or the double-clicking.

10. A method for an electronic device, wherein the electronic device comprises a touch acquisition module having an input area, which performs a touch acquisition operation, the input area includes a first area and a second area;
wherein the method comprises: calculating a first result indicating coordinates of a pointing object according to data acquired by the touch acquisition module, when a start position of a touch operation is in the first area, and calculating a second result indicating an action of the pointing object according to the data acquired by the touch acquisition module, when the start position of the touch operation is in the second area,
the electronic device further comprising a mainboard and a CPU disposed on the mainboard, wherein, the processing module is a microcontroller, and the microcontroller is connected to the mainboard and sends the first result or the second result to the CPU through the mainboard;
the method further comprising:
determining the start position of the touch operation according to the data acquired by the touch acquisition module;
calculating the coordinates of the pointing object according to the data acquired by the touch acquisition module, when the start position of the touch operation is in the first area;
calculating the second result indicating the action of the pointing object according to the data acquired by the touch acquisition module, when the start position of the touch operation is in the second area;
acquiring the operation instruction corresponding to preset action matched with the action of the pointing object; and
sending the coordinates of the pointing object or the operation instruction to the CPU through the mainboard.

11. The method according to claim 10, further comprising: acquiring an operation instruction corresponding to a preset action matched with the action of the pointing object, when the start position of the touch operation is in the second area.

12. The method according to claim 10, further comprising: obtaining a corresponding touch mode according to the action of the pointing object by calculation, as well as determining and performing a corresponding operation instruction according to a preset correspondence relationship between the touch mode and the operation instruction.

13. The method according to claim 12, wherein the corresponding operation instruction is the operation instruction for implementing the function of the main interface key of the electronic device, when the touch mode is the sliding, the clicking, the long-pressing and/or the double-clicking.

14. The method according to claim 10, wherein a part of the touch acquisition module which is located in the first area is disposed overlapping with the display screen.

15. A non-transitory tangible computer program including a computer readable storage medium having program code embodied therein that is readable by a processer of an electronic device that comprises a touch acquisition module having an input area, which performs a touch acquisition operation, the input area includes a first area and a second area;
wherein the computer program is readable by the processor to perform the steps of: calculating a first result indicating coordinates of a pointing object according to data acquired by the touch acquisition module, when a start position of a touch operation is in the first area, and calculating a second result indicating an action of the pointing object according to the data acquired by the touch acquisition module, when the start position of the touch operation is in the second area,
the electronic device further comprising a mainboard and a CPU disposed on the mainboard, wherein, the processing module is a microcontroller, and the microcontroller is connected to the mainboard and sends the first result or the second result to the CPU through the mainboard;
the computer program product is further readable by the processor to perform the steps of:
determining the start position of the touch operation according to the data acquired by the touch acquisition module;
calculating the coordinates of the pointing object according to the data acquired by the touch acquisition module, when the start position of the touch operation is in the first area;
calculating the second result indicating the action of the pointing object according to the data acquired by the touch acquisition module, when the start position of the touch operation is in the second area;
acquiring the operation instruction corresponding to preset action matched with the action of the pointing object; and
sending the coordinates of the pointing object or the operation instruction to the CPU through the mainboard.

16. The non-transitory tangible computer program according to claim 15, further causing the electronic device to perform the following step: acquiring an operation instruction corresponding to a preset action matched with the action of the pointing object, when the start position of the touch operation is in the second area.

17. The non-transitory tangible computer program according to claim 15, further causing the electronic device to perform the following step: obtaining a corresponding touch mode according to the action of the pointing object by calculation, as well as determining and performing the corresponding operation instruction according to a preset correspondence relationship between the touch mode and the operation instruction.

18. The non-transitory tangible computer program according to claim 17, wherein the corresponding operation instruction is the operation instruction for implementing the function of the main interface key of the electronic device, when the touch mode is the sliding, the clicking, the long-pressing and/or the double-clicking.

19. A method for implementing preset operations in a special area of an electronic device, the electronic device includes a touch acquisition module and a display screen, a input area being divided into a first area and a second area is disposed on the touch acquisition module, the first area is superposed with the display screen and the special area is the second area, the method comprising:
receiving a touch information indicating that a start position of a touch by a pointing object is in the special area;
judging a touch mode corresponding to the touch information; and
determining and performing a corresponding operation instruction according to a preset correspondence relationship between the touch mode and the operation instruction,
wherein the corresponding touch mode is judged in the following way:
judging whether there is a movement track of the pointing object according to the touch information; if there is, determining this touch mode as a sliding and thus obtaining the touch mode corresponding to the track of this touching; if there is no movement track of the pointing object, judging whether a contact time period with a contact point is larger than a preset contact time period, determining the corresponding touch mode as a long-pressing if it is, otherwise determining the corresponding touch mode as a clicking; and after determining the touch mode as the clicking, determining the touch mode as a double-clicking when another clicking occurs during a preset spacing time period.

20. The method according to claim 19, wherein an indicator light lying in the special area is lighted after determining the touch mode as the clicking.

21. The method according to claim 19, wherein the corresponding operation instruction is the operation instruction for implementing the function of the main interface key of the electronic device, when the touch mode is the sliding, the clicking, the long-pressing and/or the double-clicking.

22. An electronic device, comprising:
a touch acquisition module being configured to have an input area, which acquires the touch information in the input area, the input area includes a first area and a second area;
a display screen superposed with a part of the touch acquisition module which is located in the first area;
a microcontroller, which obtains a corresponding touch mode according to data acquired by the touch acquisition module by calculation, as well as determines and sends a corresponding operation instruction according to a preset correspondence relationship between the touch mode and the operation instruction, when a start position of a touch operation is in the second area;
a CPU, which receives and performs the preset operation instruction,
the microcontroller comprising:
a calculation unit for obtaining the corresponding touch mode according to the data acquired by the touch acquisition module by calculation, when the start position of the touch operation is in the second area; and
a match unit for obtaining the preset operation instruction corresponding to the touch mode by matching, according to the touch mode obtained by the calculation unit,
a contact point location unit for determining a position of the contact point according to the data acquired by the touch acquisition module;
a timing unit for recording a contact time period during which a pointing object contacts with the touch acquisition module when there is one contact pointing object and recording an order of the respective contact points when there are multiple contact points; and
an output unit for outputting the preset operation instruction to the CPU to be performed, after the calculation unit obtains the touch mode by calculation and the match unit obtains the preset operation instruction corresponding to the touch mode, when the first contact point is located in the second area.

23. The electronic device according to claim 22, wherein the touch mode is a double-clicking, a clicking, a long-pressing and/or a sliding, and the corresponding operation instruction is the operation instruction for implementing the function of the main interface key of the electronic device.

24. A non-transitory tangible computer program including a computer readable storage medium having program code embedded therein that is readable by a process of an electronic device comprising a touch acquisition module and a display screen, wherein the touch acquisition module is configured to have an input area divided into a first area superposed with the display screen and a second area as a special area, wherein the computer program is readable by the processor to perform the steps of:
receiving touch information indicating that a start position of a touch by a pointing object is in the special area;
judging a touch mode corresponding to the touch information; and
determining and performing a corresponding operation instruction according to a preset correspondence relationship between the touch mode and the operation instruction,
wherein the corresponding touch mode is judged in the following way:
judging whether there is a movement track of the pointing object according to the touch information; if there is, determining this touch mode as a sliding and thus obtaining the touch mode corresponding to the track of this touching; if there is no movement track of the pointing object, judging whether a contact time period with a contact point is larger than a preset contact time period, determining the corresponding touch mode as a long-pressing if it is, otherwise determining the corresponding touch mode as a clicking; and
after determining the touch mode as the clicking, determining the touch mode as a double-clicking when another clicking occurs during a preset spacing time period.

\* \* \* \* \*